United States Patent
Nishina

(10) Patent No.: US 9,451,621 B2
(45) Date of Patent: Sep. 20, 2016

(54) CORE NETWORK APPARATUS, RADIO BASE STATION, MOBILE TERMINAL, MOBILE COMMUNICATION SYSTEM, AND OPERATION CONTROL METHOD

(75) Inventor: Hirotaka Nishina, Tokyo (JP)

(73) Assignee: NEC Corporation, Tokyo (JP)

( * ) Notice: Subject to any disclaimer, the term of this patent is extended or adjusted under 35 U.S.C. 154(b) by 251 days.

(21) Appl. No.: 14/232,826

(22) PCT Filed: May 30, 2012

(86) PCT No.: PCT/JP2012/003526
§ 371 (c)(1),
(2), (4) Date: Jan. 14, 2014

(87) PCT Pub. No.: WO2013/014842
PCT Pub. Date: Jan. 31, 2013

(65) Prior Publication Data
US 2014/0200019 A1    Jul. 17, 2014

(30) Foreign Application Priority Data
Jul. 27, 2011    (JP) .................................. 2011-163794

(51) Int. Cl.
H04W 72/04    (2009.01)
H04W 28/16    (2009.01)
(Continued)

(52) U.S. Cl.
CPC ..... *H04W 72/0493* (2013.01); *H04M 15/8033* (2013.01); *H04M 15/83* (2013.01);
(Continued)

(58) Field of Classification Search
CPC ........... H04M 15/8033; H04M 15/83; H04M 15/835

USPC ....................................................... 455/452.1
See application file for complete search history.

(56) References Cited

U.S. PATENT DOCUMENTS

| 4,670,899 A | 6/1987 | Brody et al. |
| 5,794,140 A * | 8/1998 | Sawyer ............... H04L 41/0896 455/406 |

(Continued)

FOREIGN PATENT DOCUMENTS

| CN | 1204445 A | 1/1999 |
| CN | 1249879 A | 4/2000 |

(Continued)

OTHER PUBLICATIONS

Chinese Office Action issued by the State Intellectual Property Office of the People's Republic of China for Application No. 201280037238.0 dated Apr. 14, 2015 (34 pages).

(Continued)

*Primary Examiner* — Qun Shen
(74) *Attorney, Agent, or Firm* — Wilmer Cutler Pickering Hale and Dorr LLP

(57) ABSTRACT

A core network apparatus (1) in a mobile communication system, includes a control unit (101) that, when a resource utilization rate of the own apparatus falls below a predetermined threshold, makes a transition to an MME utilization promotion state and transmits, to a radio base station (2), an MME promotion start message (111) for encouraging a terminal (3) to perform a communication. When the network utilization rate is low, it is possible to improve the utilization rate by transmitting the MME promotion start message, which is a utilization promotion message.

10 Claims, 18 Drawing Sheets

(51) Int. Cl.
*H04M 15/00* (2006.01)
*H04W 4/24* (2009.01)

(52) U.S. Cl.
CPC ............ *H04M15/835* (2013.01); *H04M 15/84* (2013.01); *H04M 15/85* (2013.01); *H04W 4/24* (2013.01); *H04W 28/16* (2013.01); *H04M 2215/0192* (2013.01)

(56) References Cited

U.S. PATENT DOCUMENTS

| | | | |
|---|---|---|---|
| 5,970,403 | A | 10/1999 | Alperovich et al. |
| 6,006,085 | A | 12/1999 | Balachandran |
| 8,380,593 | B1 * | 2/2013 | Patro .................. H04L 43/08 379/114.03 |
| 2003/0097461 | A1 * | 5/2003 | Barham ................ H04L 29/06 709/235 |
| 2004/0072574 | A1 * | 4/2004 | Matz .................... H04M 15/00 455/453 |
| 2006/0030291 | A1 | 2/2006 | Dawson et al. |
| 2006/0040641 | A1 * | 2/2006 | Dawson ............. G06Q 10/1091 455/405 |
| 2006/0142018 | A1 | 6/2006 | Matz et al. |
| 2007/0287414 | A1 | 12/2007 | Dawson et al. |
| 2008/0207164 | A1 | 8/2008 | Dawson et al. |

FOREIGN PATENT DOCUMENTS

| | | |
|---|---|---|
| CN | 1313002 A | 9/2001 |
| JP | 2004-062342 A | 2/2004 |
| JP | 2005-159649 A | 6/2005 |
| JP | 2005-322981 A | 11/2005 |
| JP | 2006-135516 A | 5/2006 |
| JP | 2007-110584 A | 4/2007 |
| JP | 2007-328564 A | 12/2007 |
| WO | WO-99/66706 A1 | 12/1999 |
| WO | WO-2004/030383 A1 | 4/2004 |
| WO | WO-2005/011295 A2 | 2/2005 |

OTHER PUBLICATIONS

International Search Report corresponding to International Application No. PCT/JP2012/003526, Aug. 31, 2012, 5 pages.
Japanese Office Action issued by the Japanese Patent Office for Japanese Patent Application No. 2013-525543 mailed Nov. 4, 2014 (7 pages with translation).
European Search Report corresponding to European Patent Application No. 12817859.7, dated Feb. 17, 2015, 10 pages.

* cited by examiner

CORE NETWORK APPARATUS, RADIO BASE STATION, MOBILE TERMINAL, MOBILE COMMUNICATION SYSTEM, AND OPERATION CONTROL METHOD

CROSS-REFERENCE TO RELATED APPLICATIONS

This application is a national stage application of International Application No. PCT/JP2013/003526, entitled "Core Network Apparatus, Radio Base Station, Mobile Terminal, Mobile Communication System, and Operation Control Method," filed on May 30, 2012, which claims the benefit of the priority of Japanese Patent Application No. 2011-163794, filed on Jul. 27, 2011, the disclosures of each of which are hereby incorporated in their entirety.

TECHNICAL FIELD

The present invention relates to a core network apparatus, a radio base station, a mobile terminal, a mobile communication system, and an operation control method. In particular, the present invention relates to a mobile communication system including a core network, a radio base station, and a mobile terminal.

BACKGROUND ART

A mobile communication system related to the present invention will be described with reference to FIG. 19. The mobile communication system related to the present invention include terminals 903 which are movable wireless devices used by users and called UE (user equipment) in the LTE (Long Term Evolution), radio base stations 902 which communicates with the terminals 903 and are called eNB (enhanced Nodes B) in the LTE, and a core network 901 which is an upper network of these nodes and called a MME (mobility management entity) and a SGW (serving gateway) in the LTE.

In addition, as interfaces between these above nodes, there are an RRC (radio resource control) interface 913 as a radio interface, an X2 interface 912 as an interface between the base stations 902, and S1 interfaces 911 as interfaces respectively between each of the base stations 902 and the core network 901.

In the network of the mobile communication system, the utilization rate dynamically varies according to a difference in time, place, radio environment, or the like. As used herein, the utilization rate refers to the resource utilization state of the hardware in the radio base station or the core network, the wireless or wired band occupancy rate of the RRC, X2, or S1 interface, the number of users, or the amount of data.

In mobile communication system, there are technologies for reducing the utilization rate such as user acceptance control and congestion control (for example, see Patent Literature 1). On the other hand, in order to increase the profits of the operator of a mobile communication system and to increase user satisfaction, it is preferred to increase the utilization rate of the network to flat and smooth it.

CITATION LIST

Patent Literature

[Patent Literature 1] Japanese Unexamined Patent Application Publication No. 2006-135516

SUMMARY OF INVENTION

Technical Problem

If advantageous conditions concerning the price or the like are dynamically presented to the users as a promotion when the network utilization rate of the mobile communication system is low, the utilization rate can be increased. This could result in a new revenue source for the operator. However, there is no concrete means for dynamically encouraging the users to use the network so as to increase the utilization rate.

The present invention has been made to solve the above problem, and an object thereof is to provide a core network apparatus, radio base station, mobile terminal, mobile communication system, and operation control method which can increase the utilization rate of the network when the utilization rate is low.

Solution to Problem

A core network apparatus of the present invention in a mobile communication system, comprising a means, when a resource utilization rate of the core network apparatus falls below a predetermined threshold, for making a transition to a core network utilization promotion state and transmitting, to a radio base station, a utilization promotion message for encouraging a mobile terminal to perform a communication.

An operation control method of the present invention for a core network apparatus in a mobile communication system, comprising the step, when a resource utilization rate of the core network apparatus falls below a predetermined threshold, for making a transition to a core network utilization promotion state and transmitting, to a radio base station, a utilization promotion message for encouraging a mobile terminal to perform a communication.

A radio base station of the present invention in a mobile communication system, comprising a means, if a resource utilization rate of the radio base station falls below a predetermined threshold when the radio base station receives a core network utilization promotion message transmitted from a core network, the core network having made a transition to a core network utilization promotion state when a resource utilization rate of the core network falls below a predetermined threshold, the core network utilization promotion message being intended to encourage a mobile terminal to perform a communication, for making a transition to a radio base station utilization promotion state and transmitting, to the mobile terminal, a radio base station utilization promotion message for encouraging the mobile terminal to perform a communication.

An operation control method of the present invention for a radio base station in a mobile communication system, comprising the step, if a resource utilization rate of the radio base station falls below a predetermined threshold when the radio base station receives a core network utilization promotion message transmitted from a core network, the core network having made a transition to a core network utilization promotion state when a resource utilization rate of the core network falls below a predetermined threshold, the core network utilization promotion message being intended to encourage a mobile terminal to perform a communication, for making a transition to a radio base station utilization promotion state and transmitting, to the mobile terminal, a radio base station utilization promotion message for encouraging the mobile terminal to perform a communication.

A mobile terminal of the present invention in a mobile communication system, comprising a means, when the mobile terminal receives a radio base station utilization promotion message transmitted from a radio base station, the radio base station having made a transition to a radio base station utilization promotion state when a resource utilization rate of the radio base station falls below a predetermined threshold when the radio base station receives a core network utilization promotion message transmitted from a core network, the core network having made a transition to a core network utilization promotion state when a resource utilization rate of the core network falls below a predetermined threshold, the core network utilization promotion message being intended to encourage the mobile terminal to perform a communication, for making a transition to a terminal utilization promotion state and displaying a message encouraging a user to perform a communication using the mobile terminal.

A mobile terminal of the present invention in a mobile communication system, comprising a means, when the mobile terminal receives a radio base station utilization promotion message transmitted from a radio base station, the radio base station having made a transition to a radio base station utilization promotion state when a resource utilization rate of the radio base station falls below a predetermined threshold when the radio base station receives a core network utilization promotion message transmitted from a core network, the core network having made a transition to a core network utilization promotion state when a resource utilization rate of the core network falls below a predetermined threshold, the core network utilization promotion message being intended to encourage the mobile terminal to perform a communication, the radio base station utilization promotion message being intended to encourage the mobile terminal to perform a communication, for making a transition to a terminal utilization promotion state and making a connection request to the radio base station in order to transmit predetermined data held by the mobile terminal to a predetermined destination or in order to receive predetermined data from a predetermined source.

An operation control method of the present invention for a mobile terminal in a mobile communication system, comprising the step, when the mobile terminal receives a radio base station utilization promotion message transmitted from a radio base station, the radio base station having made a transition to a radio base station utilization promotion state when a resource utilization rate of the radio base station falls below a predetermined threshold when the radio base station receives a core network utilization promotion message transmitted from a core network, the core network having made a transition to a core network utilization promotion state when a resource utilization rate of the core network falls below a predetermined threshold, the core network utilization promotion message being intended to encourage the mobile terminal to perform a communication, for making a transition to a terminal utilization promotion state and displaying a message encouraging a user to perform a communication using the mobile terminal.

An operation control method of the present invention for a mobile terminal in a mobile communication system, comprising the step, when the mobile terminal receives a radio base station utilization promotion message transmitted from a radio base station, the radio base station having made a transition to a radio base station utilization promotion state when a resource utilization rate of the radio base station falls below a predetermined threshold when the radio base station receives a core network utilization promotion message transmitted from a core network, the core network having made a transition to a core network utilization promotion state when a resource utilization rate of the core network falls below a predetermined threshold, the core network utilization promotion message being intended to encourage the mobile terminal to perform a communication, the radio base station utilization promotion message being intended to encourage the mobile terminal to perform a communication, for making a transition to a terminal utilization promotion state and making a connection request to the radio base station in order to transmit predetermined data held by the mobile terminal to a predetermined destination or in order to receive predetermined data from a predetermined source.

A mobile communication system of the present invention comprising: a core network; a radio base station; and a mobile terminal, wherein the core network comprises a means, when a resource utilization rate of the core network falls below a predetermined threshold, for making a transition to a core network utilization promotion state and transmitting, to the radio base station, a core network utilization promotion message for encouraging the mobile terminal to perform a communication.

Advantageous Effects of Invention

According to the present invention, an effect that is possible to achieve an increase of the utilization rate of the network when the utilization rate is low is obtained.

DESCRIPTION OF EMBODIMENTS

Now, embodiments of the present invention will be described with reference to the drawings. First, a mobile communication system according to the present invention will be outlined. The mobile communication system according to the present invention includes a core network, radio base stations, and mobile terminals. The core network includes means configured to, when the resource utilization rate of the core network falls below a predetermined threshold, make a transition to a core network utilization promotion state and to transmit, to the radio base stations, a core network utilization promotion message for encouraging the mobile terminals to perform a communication.

As seen above, when the resource utilization rate of the core network is low, the core network transmits, to the radio base stations, a core network utilization promotion message for encouraging the mobile terminals to perform a communication. Thus, the utilization rate can be increased.

Figure 1:
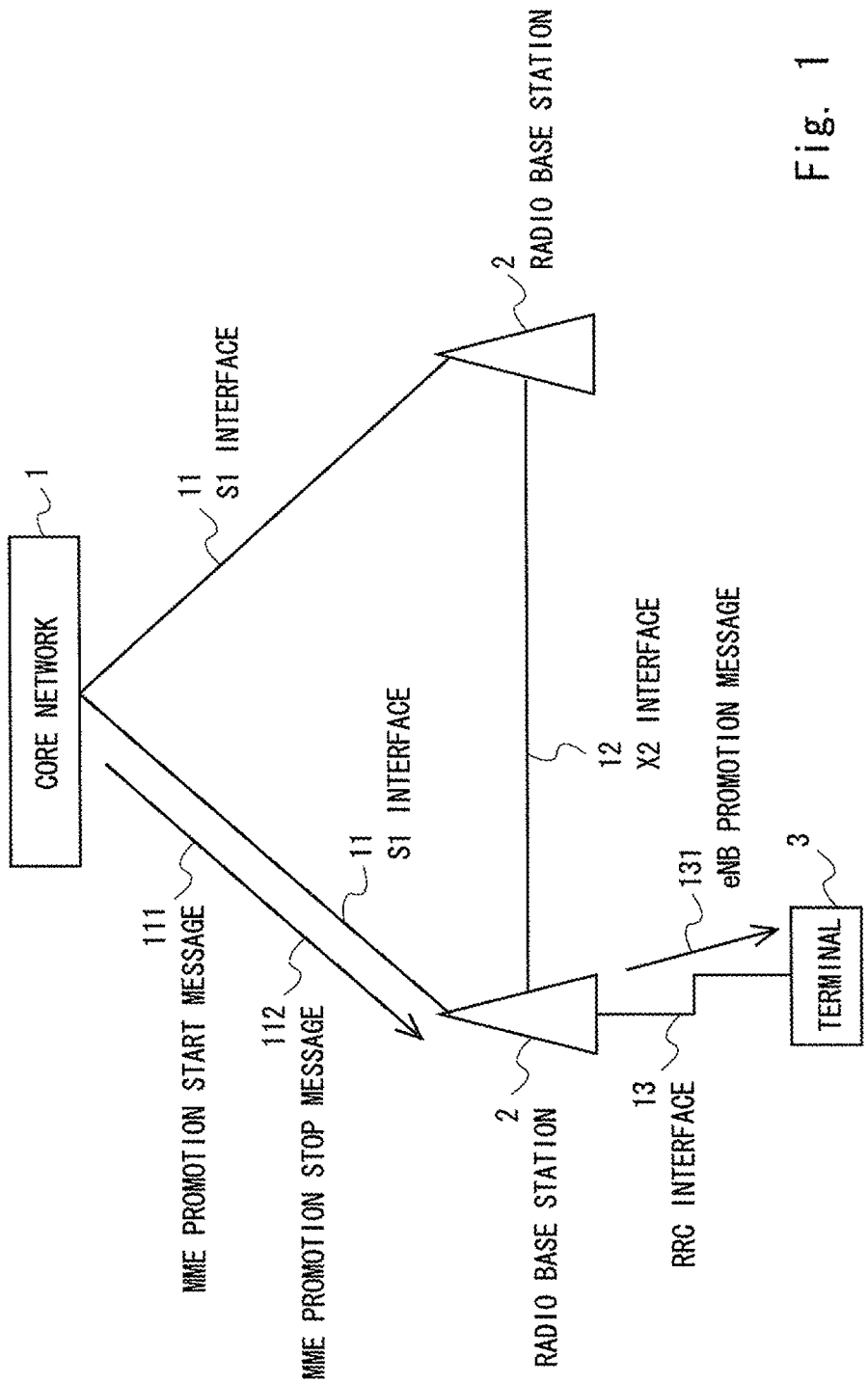
FIG. 1 is a diagram showing the configuration of a mobile communication system according to an embodiment of the present invention.

FIG. 1 is a diagram showing the configuration of a mobile communication system according to an embodiment of the present invention. In FIG. 1, the mobile communication system according to the embodiment of the present invention includes terminals 3 which are movable wireless devices used by the user and called UE in the LTE, radio base stations 2 which wirelessly communicate with the terminals 3 and are called eNB in the LTE, and a core network 1 which is an upper network of these nodes and called MME and SGW in the LTE. In addition, as interfaces between these nodes, an RRC interface 13 for wireless, an X2 interface 12 between the base stations 2, and an S1 interface 11 between each base station 2 and the core network 1 are provided.

Figure 2:
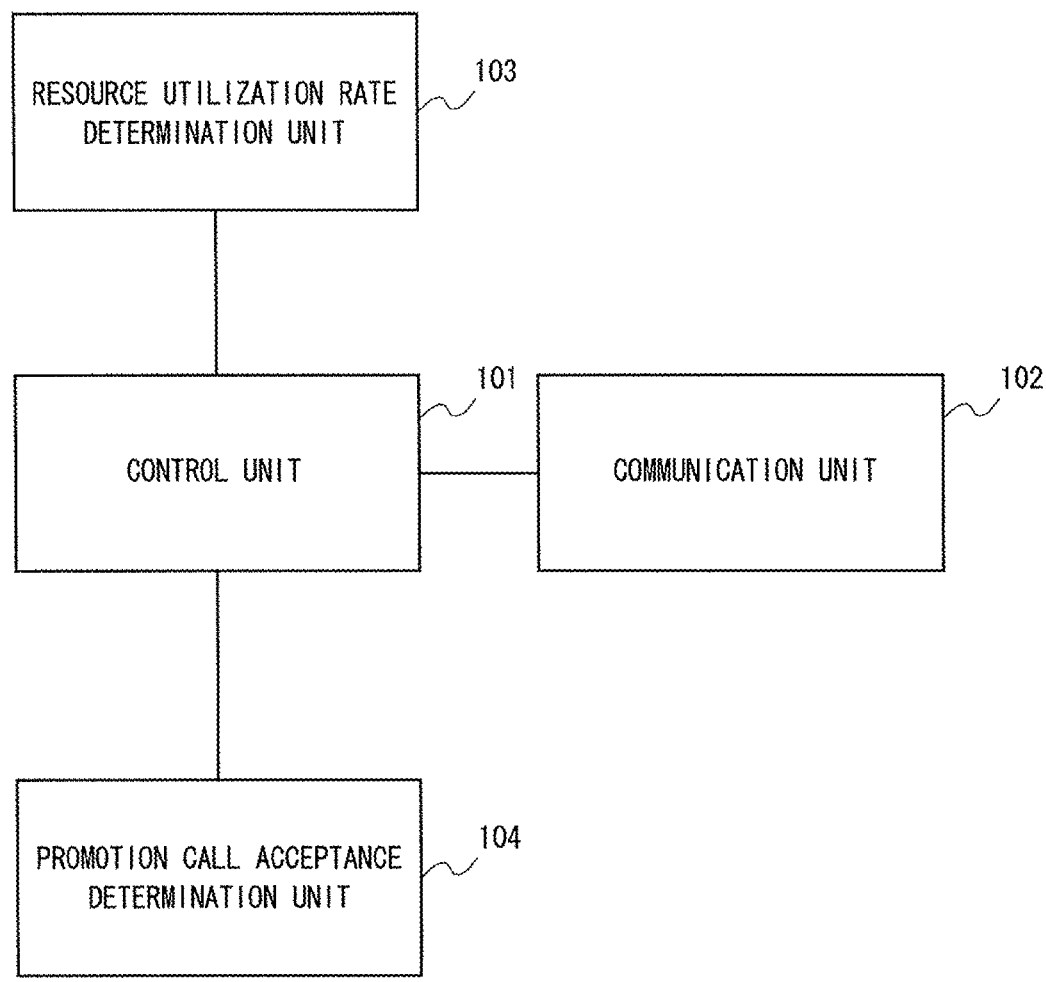
FIG. 2 is a diagram showing the configuration of the core network of FIG. 1.

The core network 1 includes MME, which performs network control, and SGW, which handles user data. The core network 1 performs service control or charging control and is connected to the Internet or telephone networks. FIG. 2 is a diagram showing the configuration of the core network 1 of FIG. 1. A resource utilization rate determination unit 103 of the core network 1 measures the number of users connected to the MME or SGW oneself or the amount of user data being processed, compares the measured value with an allowable value to obtain a resource utilization rate, and compares the obtained resource utilization rate with a predetermined value. If the resource utilization rate falls below the predetermined value, a control unit 101 of the core network 1 determines that it is in the utilization promotion possible state.

In this case, by using a communication unit 102, the control unit 101 transmits MME promotion start messages 111 to the radio base stations 2 connected through the S1 interfaces 11. The MME promotion start messages 111 are information notifying the radio base stations 2 under the core network 1 of the start of utilization promotion for encouraging the terminals to perform a communication.

If a promotion call acceptance determination unit 104 determines that it can accept a call which is made using the transmitted message as a trigger and connected, the core network 1 handles the call as a promotion call and charges the user at a discount or a flat rate. In contrast, if the resource utilization rate exceeds the predetermined value, the control unit 101 determines that it is in the utilization promotion impossible state and transmits MME promotion stop messages 112 to the radio base stations 2 connected through the S1 interfaces 11 to stop connecting promotion calls.

Figure 3:
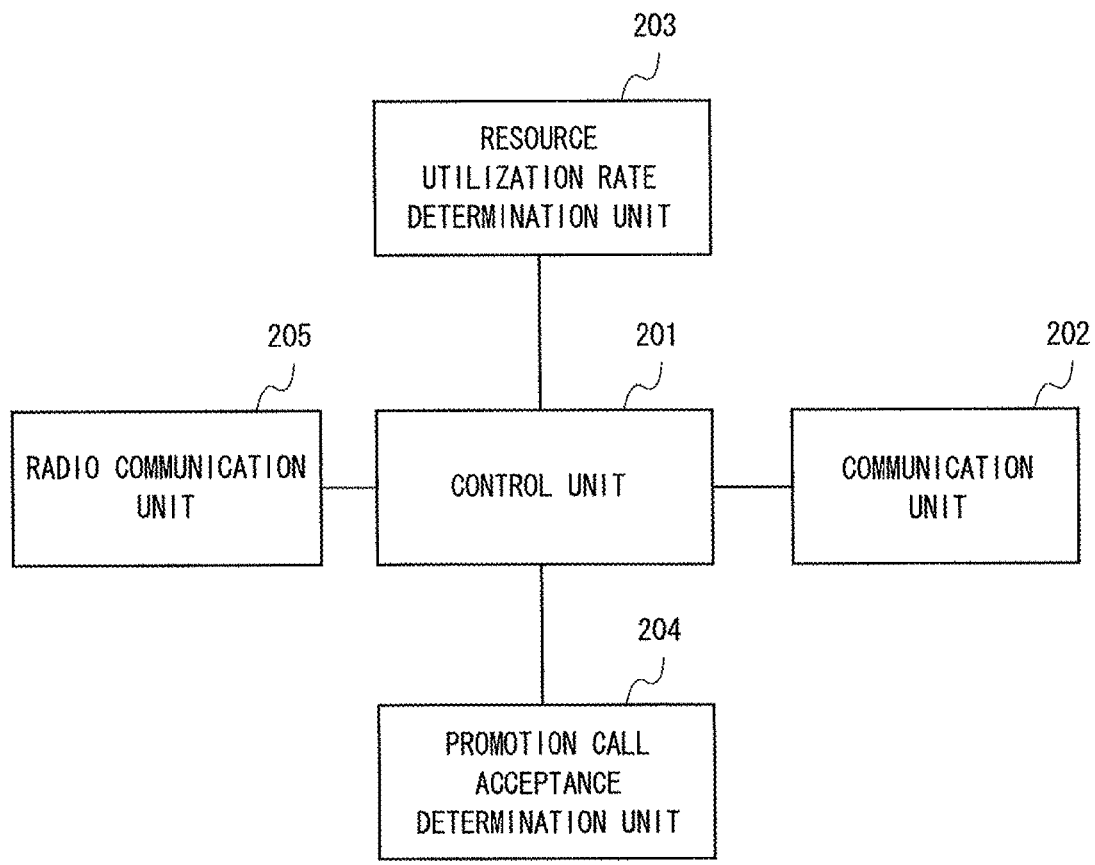
FIG. 3 is a diagram showing the configuration of the radio base station of FIG. 1.

The radio base stations 2 are apparatuses configured to wirelessly communicate with the terminals 3 and have a function of relaying user data between each terminal 3 and the core network 1 under the control of the upper core network 1. FIG. 3 is a diagram showing the configuration of the radio base station 2 of FIG. 1. When the radio base station 2 receives an MME promotion start message 111 from the core network 1 using a communication unit 202, it determines that the connected core network 1 is in a utilization promotion state.

In addition, a resource utilization rate determination unit 203 of the radio base station 2 measures the number of users connected to the radio base station 2, the amount of data being processed, or the radio resource, or the amount of information on the transmission path of the S1 or X2 interface, compares the measured value with an allowable value to obtain a resource utilization rate, and compares the obtained resource utilization rate with a predetermined value. When the resource utilization rate falls below the predetermined value, the control unit 201 of the radio base station 2 determines that it is in the utilization promotion possible state.

In this case, by using a radio communication unit 205, the control unit 201 transmits eNB promotion messages 131 to the terminals 3 existing in the radio coverage of the radio base station 2 through the RRC interfaces 13. The eNB promotion messages 131 are information indicating a utilization promotion for encouraging the terminals 3 under the radio base station 2 to perform a communication. Preferably, the radio base station 2 periodically broadcasts the eNB promotion messages 131 to the terminals 3 thereunder using annunciation information (system information). A promotion call acceptance determination unit 204 of the radio base station 2 determines whether it can accept a connection request transmitted from any terminal as a trigger that has transmitted this message.

Figure 4:
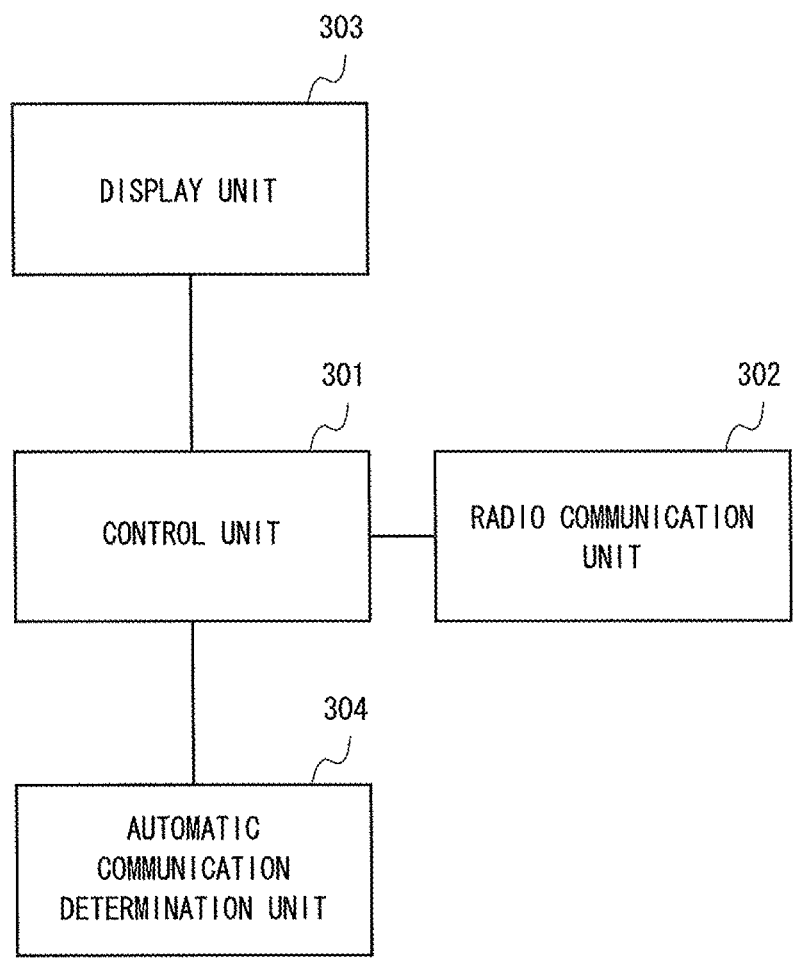
FIG. 4 is a diagram showing the configuration of the terminal of FIG. 1.

The terminal 3 is a wireless device with which the user makes voice calls, or transmits or receives data. FIG. 4 is a diagram showing the configuration of the terminal 3 of FIG. 1. When the terminal 3 receives an eNB promotion message 131 from the radio base station 2 using a radio communication unit 302, it determines that the core network 1 and the radio base station 2 are in a utilization promotion state. Then, a control unit 301 of the terminal 3 displays, on a display unit 303, a message encouraging the user to perform a communication using the own terminal. When the user looks at the display and performs an operation, the control unit 301 starts a communication as a promotion call. Alternatively, instead of the calling based on the manual operation of the user, the control unit 301 automatically starts transmission or reception of data as a promotion call. This automatic calling is performed by the control unit 301 on the basis of the result of a determination made by an automatic communication determination unit 304 of the terminal 3.

Through the S1 interface 11 between each radio base station 2 and the core network 1, an MME promotion start message 111 flows to the direction from the core network 1 to each radio base station 2. The MME promotion start message 111 is a message indicating that the MME is in a utilization promotion state. It may include a core network identification ID, a message validity period, the QoS type and data amount of a call whose utilization promotion is possible, an MME promotion code, which is a unique value used to determine whether a promotion call can be accepted, or the like. Also, an MME promotion stop message 112 flows in the direction from the core network 1 to each radio base station 2 through the S1 interface 11. This message indicates that the MME has been in a non-utilization promotion state.

The eNB promotion messages 131 flow in the direction from each radio base station 2 to the terminals 3 through the RRC interfaces 13. The eNB promotion message 131 is periodically transmitted when the eNB is in a utilization promotion state. The eNB promotion message 131 may include an eNB cell identification ID, a message validity period, the QoS type and data amount of a call whose utilization promotion is possible, an eNB promotion code, which is a unique value used to determine whether a promotion call can be accepted, an MME promotion code received from the core network 1, or the like.

Figure 5:
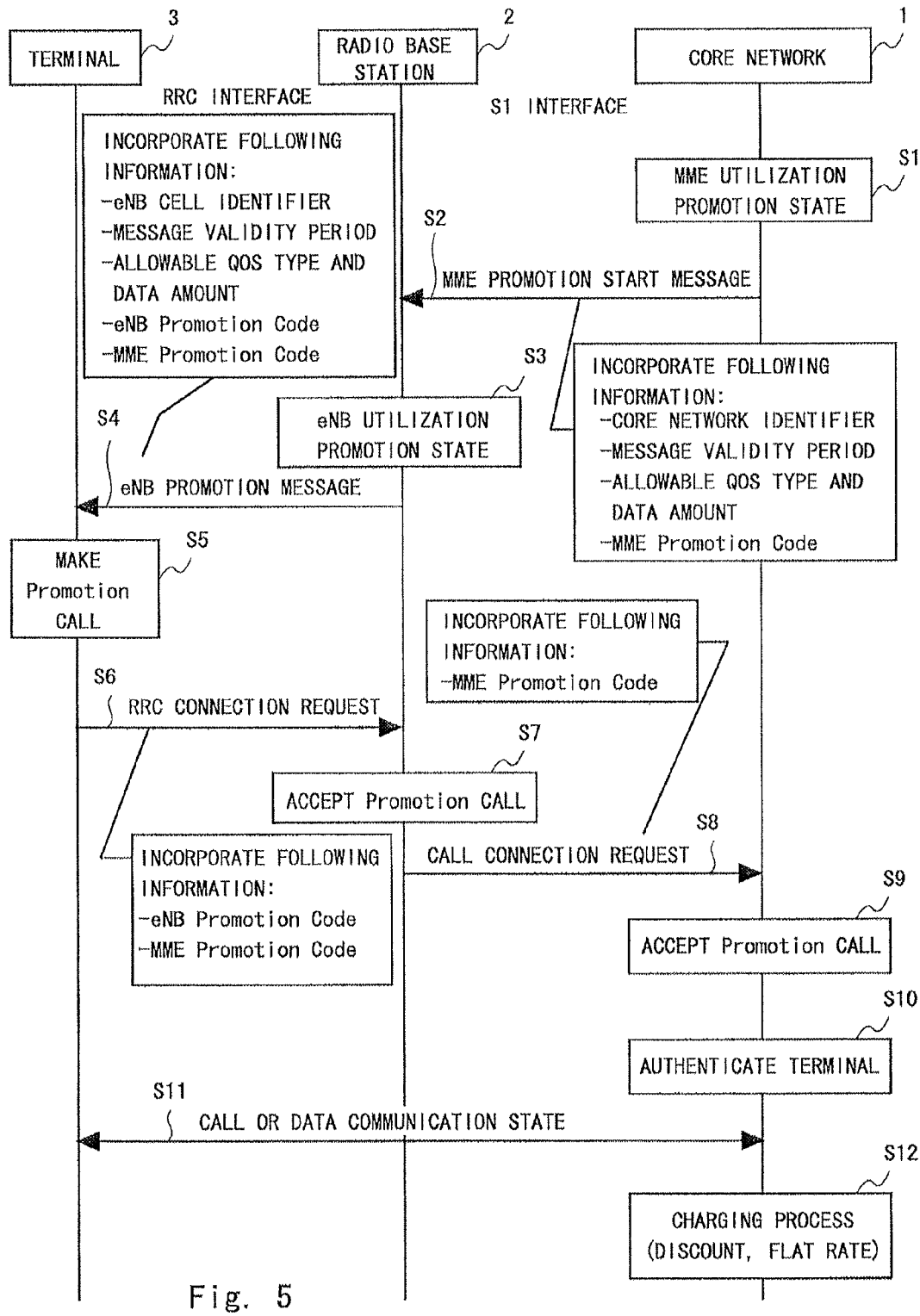
FIG. 5 is a sequence diagram showing an example of a connection operation of a promotion call in the mobile communication system of FIG. 1.

FIG. 5 is a sequence diagram showing an example of a connection operation of a promotion call in the mobile communication system according to the embodiment of the present invention shown in FIG. 1. In FIG. 5, when the core network 1 transits in an MME utilization promotion state (step S1), it transmits an MME promotion start message addressed to each radio base station 2 through the S1 interface (step S2). Each radio base station 2 receives the MME promotion start message and transits in an eNB utilization promotion state (step S3). Thus, each radio base station 2 periodically transmits eNB promotion messages addressed to the terminals 3 through the RRC interfaces (step S4).

The terminals 3 that received the eNB promotion messages, through a process of a making promotion call (step S5), transmit RRC connection requests addressed to the radio base station 2 through the RRC interfaces (step S6). At this time, the terminals 3 transmit, to the radio base station 2, eNB promotion codes and MME promotion codes received through the eNB promotion messages. The radio base station 2 that received the eNB promotion codes from the terminals 3 compares each code with the eNB promotion code which the radio base station 2 has transmitted to each terminal 3 through the eNB promotion message in step S4. Thus, the radio base station 2 determines whether to accept each connection request.

If these two codes are different, the radio base station 2 rejects the connection from the terminal 3; if the two codes are the same, it accepts the connection (step S7) and makes a call connection request to the core network 1 (step S8). In making the call connection request, the radio base station 2 incorporates the MME promotion code received from the terminal 3 into an initial UE message or NAS message through the S1 interface. The core network 1 that received the call connection request including the MME promotion code compares the code with the MME promotion code that it has transmitted through the MME promotion start message in step S2. Thus, the core network 1 determines whether to accept the connection request.

If these two codes are different, the core network 1 rejects the call connection; if the two codes are the same, it accepts the call connection (step S9). The core network 1 then authenticates the terminal 3 (step S10), and thus becomes a call or data communication state in between the terminal 3 and the core network 1 (step S11). The core network 1 handles, as a promotion call, the call connected through the promotion call acceptance process of step S9 and performs a charging process of applying a special price, such as a discount or flat rate, to the user (step S12).

Figure 6:
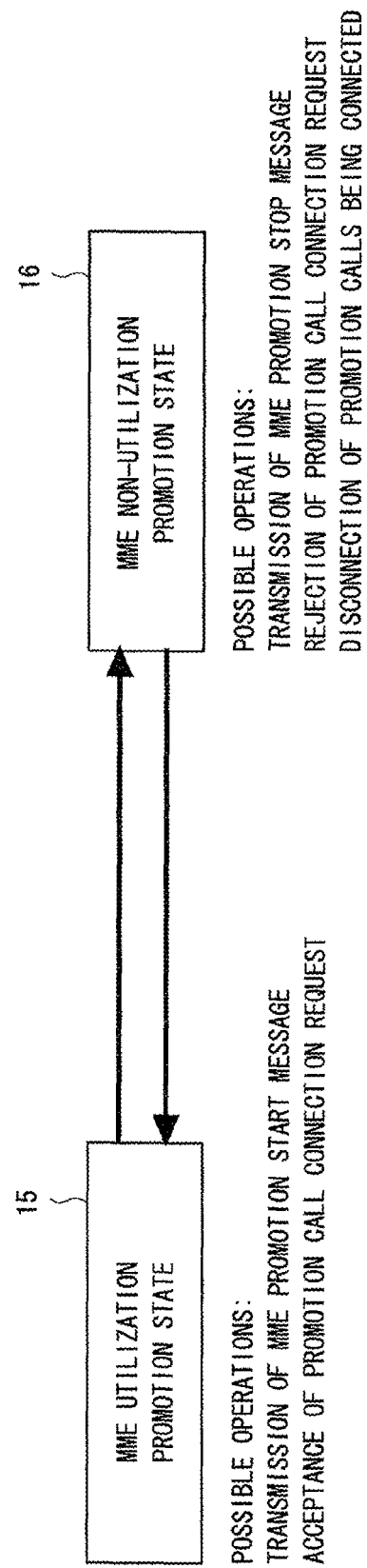
FIG. 6 is a state transition diagram of the core network of FIG. 1.

Next, the operation of the core network 1 of FIG. 1 will be described with reference to FIGS. 6 to 8. FIG. 6 is a state transition diagram of the core network 1 of FIG. 1. As shown in FIG. 6, the core network 1 has two states: an MME utilization promotion state 15 and an MME non-utilization promotion state 16. The core network 1 in the MME utilization promotion state 15 transmits MME promotion start messages to the radio base stations 2 through the S1 interfaces. When it receives a promotion call connection request from any radio base station 2, the core network 1 checks whether the MME promotion codes are a match and then accepts the promotion call. The core network 1 in the MME non-utilization promotion state 16 transmits MME promotion stop messages through the S1 interfaces and rejects a promotion call connection request from any radio base station 2, as well as disconnecting promotion calls being connected.

Figure 7:
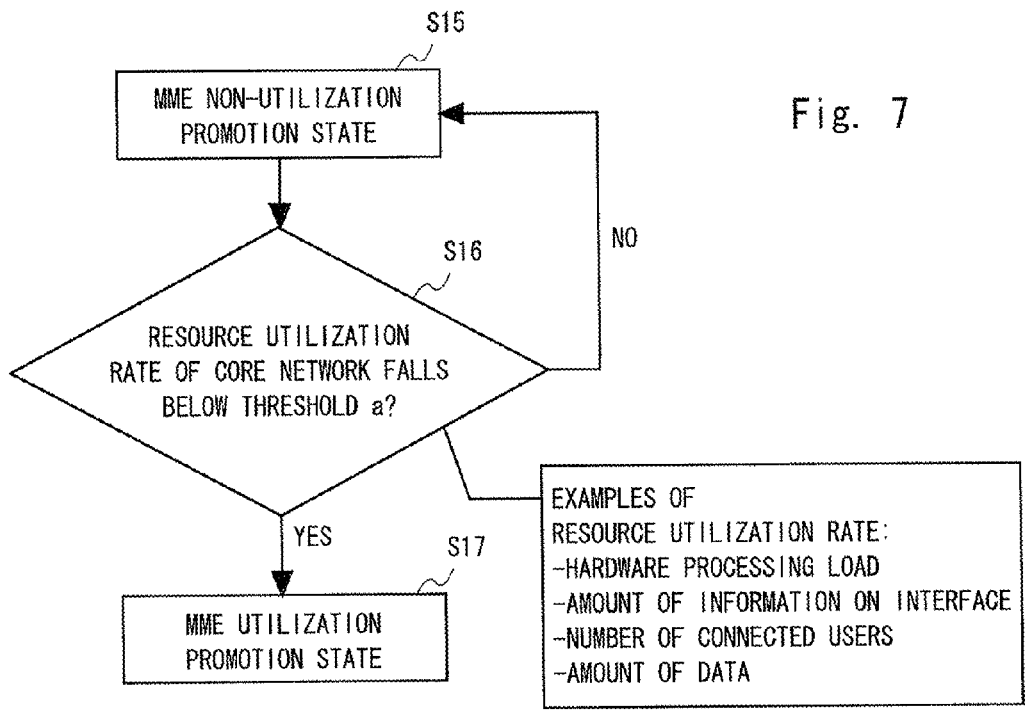
FIG. 7 is a determination flowchart for a transition of the core network of FIG. 1 to the MME utilization promotion state.

FIG. 7 is a determination flowchart for a transition of the core network 1 of FIG. 1 to the MME utilization promotion state. When the core network 1 in the MME non-utilization promotion state (step S15) determines that the resource utilization rate of the core network 1 falls below a threshold a (step S16), it makes a transition to the MME utilization promotion state (step S17). As used herein, the resource utilization rate is the ratio of the hardware processing load on the MME or SGW, the amount of information on the inter-hardware interface, the number of connected users, the amount of data, or the like to an allowable amount.

Figure 8:
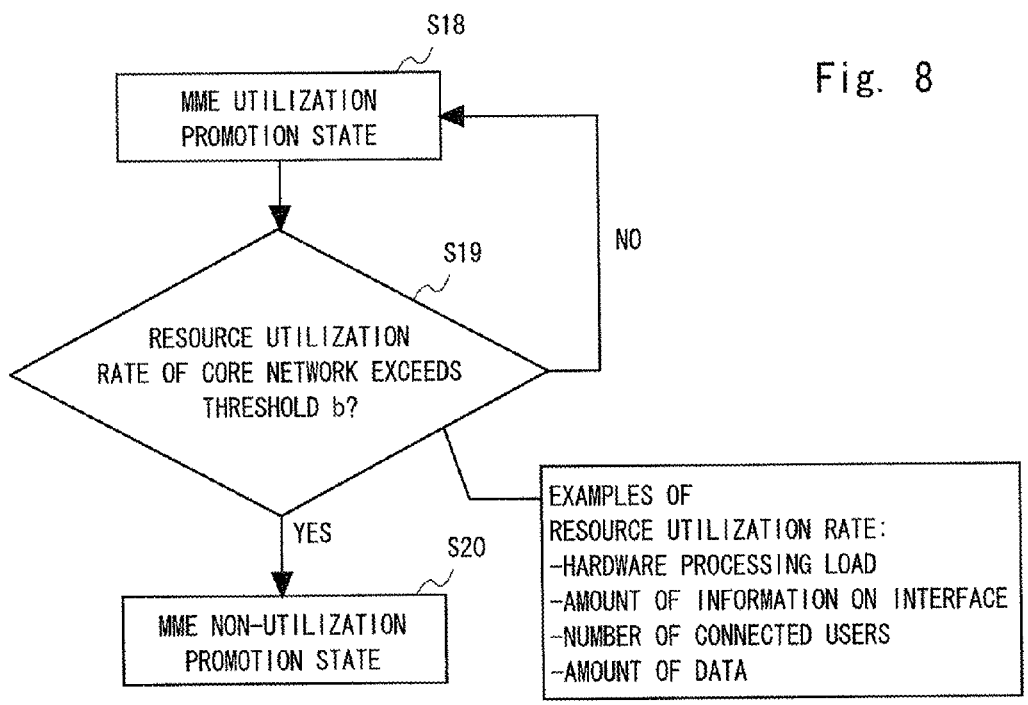
FIG. 8 is a determination flowchart for a transition of the core network of FIG. 1 to the MME non-utilization promotion state.

FIG. 8 is a determination flowchart for a transition of the core network 1 of FIG. 1 to the MME non-utilization promotion state. When the core network 1 in the MME utilization promotion state (step S18) determines that the resource utilization rate of the core network 1 exceeds a threshold b (step S19), it makes a transition to the MME non-utilization promotion state (step S20). As used herein, the resource utilization rate is the ratio of the hardware processing load on the MME or SGW, the amount of information on the inter-hardware interface, the number of connected users, the amount of data, or the like to an allowable amount.

Figure 9:
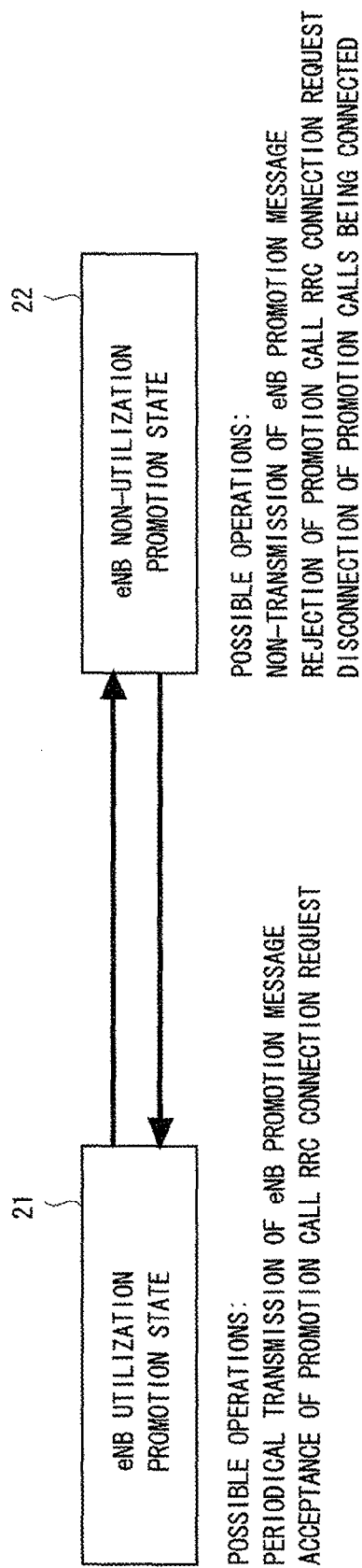
FIG. 9 is a state transition diagram of the radio base station of FIG. 1.

Next, the operation of the radio base station 2 of FIG. 1 will be described with reference to FIGS. 9 to 11. FIG. 9 is a state transition diagram of the radio base station 2 of FIG. 1. As shown in FIG. 9, the radio base station 2 has two states: an eNB utilization promotion state 21 and an eNB non-utilization promotion state 22. The radio base station 2 in the eNB utilization promotion state 21 periodically transmits eNB promotion messages to the terminals 3 through the RRC interfaces. When the radio base station 2 receives a promotion call RRC connection request from any terminal 3, it accepts the connection request if it confirms that the eNB promotion codes are a match. The radio base station 2 in the eNB non-utilization promotion state 22 stops transmitting eNB promotion messages through the RRC interfaces and rejects a promotion call RRC connection request from any terminal 3, as well as disconnecting promotion calls being connected.

Figure 10:
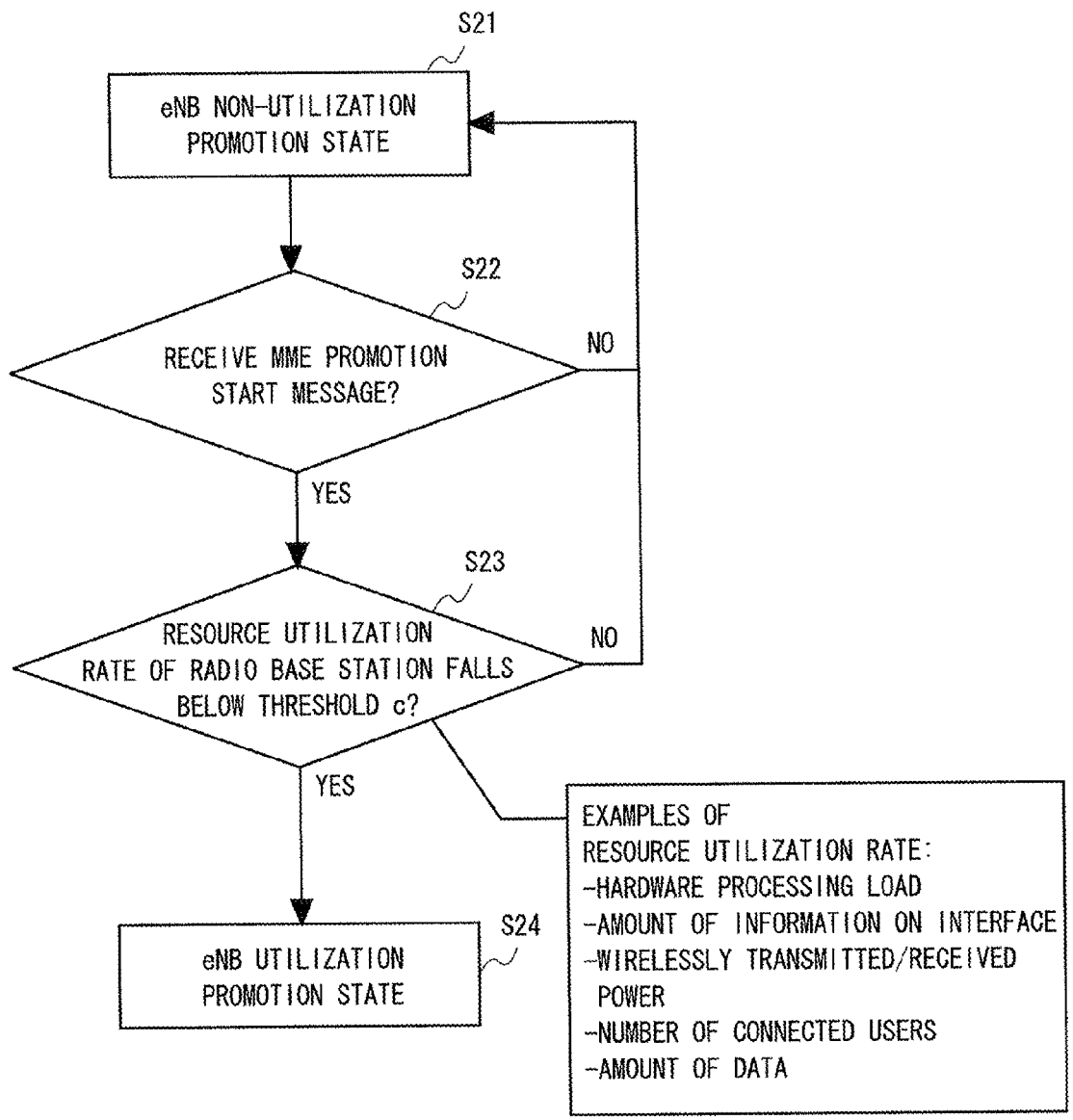
FIG. 10 is a determination flowchart for a transition of the radio base station of FIG. 1 to the eNB utilization promotion state.

FIG. 10 is a determination flowchart for a transition of the radio base station 2 of FIG. 1 to the eNB utilization promotion state. When the radio base station 2 in the eNB non-utilization promotion state (step S21) receives an MME promotion start message from the core network 1 (step S22), it proceeds to step S23. If the radio base station 2 determines in step S23 that the resource utilization rate thereof falls below a threshold c, it makes a transition to an eNB utilization promotion state (step S24). As used herein, the resource utilization rate is the ratio of the hardware processing load on the radio base station 2, the amount of information on the S1 or X2 interface, the wirelessly transmitted or received power, the number of connected users, or the amount of data to an allowable amount.

Figure 11:
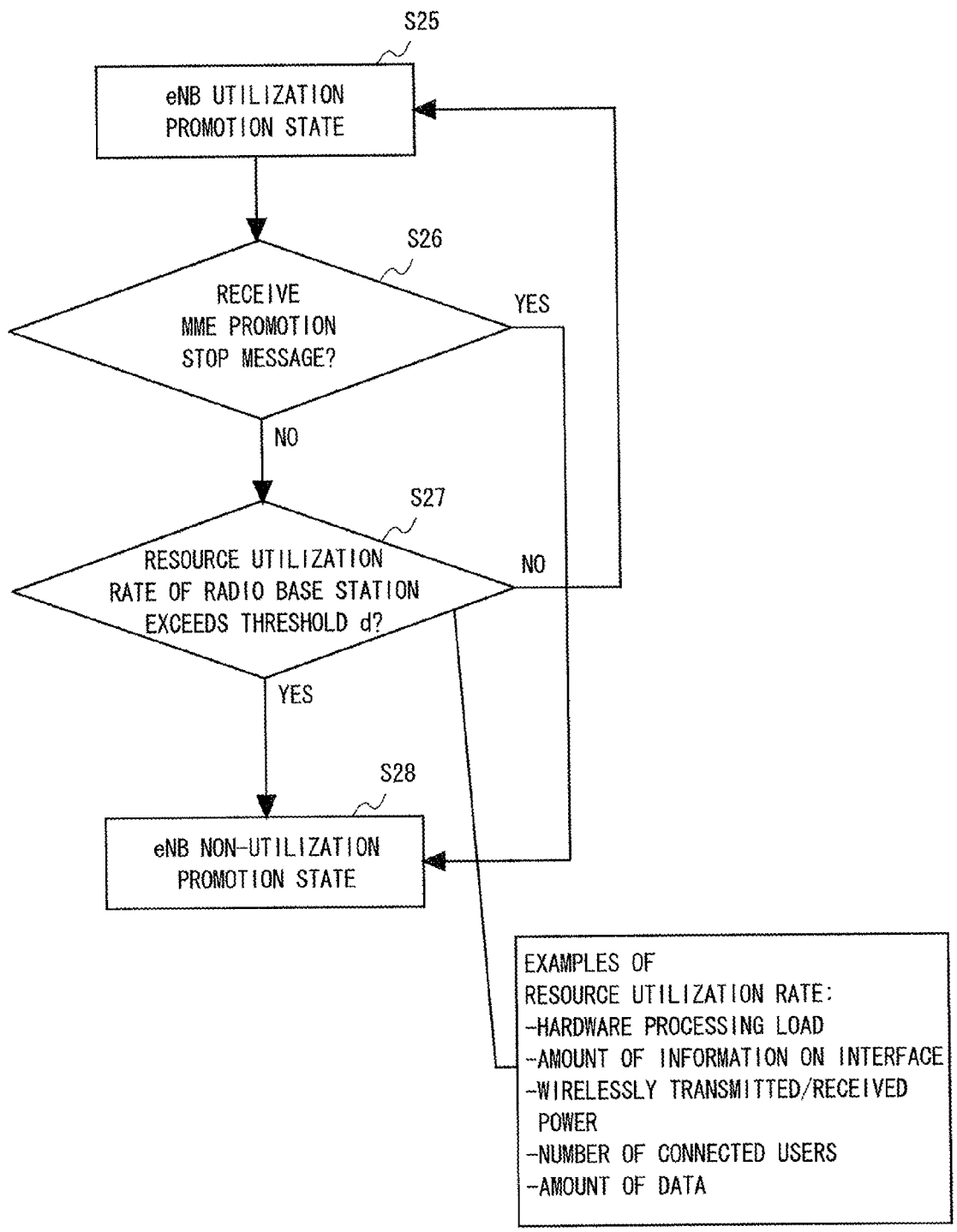
FIG. 11 is a determination flowchart for a transition of the radio base station of FIG. 1 to the eNB non-utilization promotion state.

FIG. 11 is a determination flowchart for a transition of the radio base station 2 of FIG. 1 to the eNB non-utilization promotion state. When the radio base station 2 in the eNB utilization promotion state (step S25) receives an MME promotion stop message from the core network 1 (step S26), it proceeds to step S28. Even if the radio base station 2 does not receive an MME promotion stop message in step S26, when the radio base station 2 determines that the resource utilization rate thereof exceeds a threshold d (step S27), it proceeds to step S28. In step S28, the radio base station 2 makes a transition to the eNB non-utilization promotion state. As used herein, the resource utilization rate is the ratio of the hardware processing load on the radio base station 2, the amount of information on the S1 or X2 interface, the wirelessly transmitted or received power, the number of connected users, or the amount of data to an allowable amount.

Figure 12:
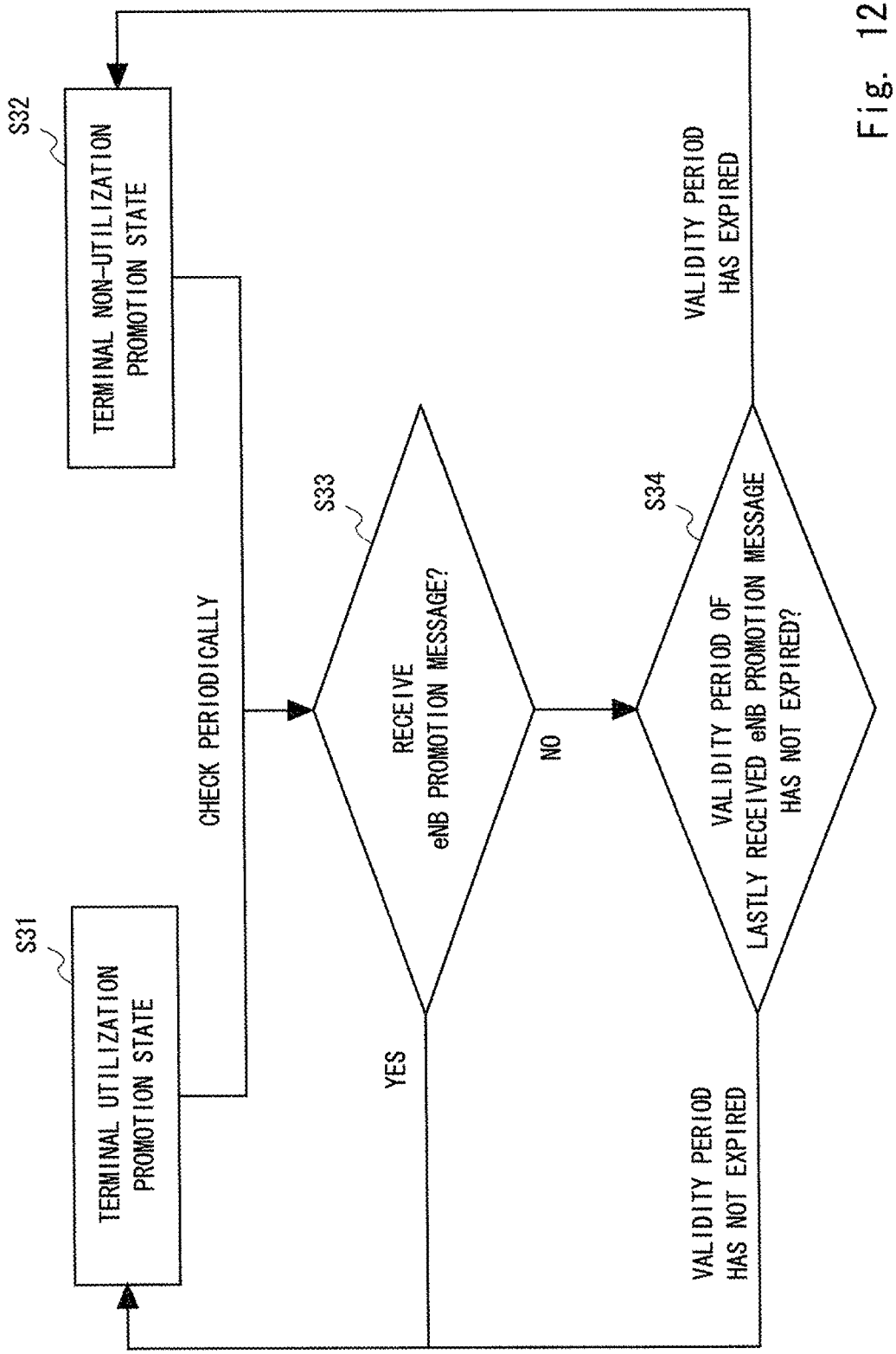
FIG. 12 is a determination flowchart for a transition of the terminal of FIG. 1 to a terminal utilization promotion state/terminal non-utilization promotion state.

Next, the operation of the terminal 3 of FIG. 1 will be described with reference to FIGS. 12 to 14. FIG. 12 is a determination flowchart for a transition of the terminal 3 of FIG. 1 to a terminal utilization promotion state/terminal non-utilization promotion state. As shown in FIG. 12, the terminal 3 has two states: a terminal utilization promotion state (step S31) and a terminal non-utilization promotion state (step S32). In either of these states, when the terminal 3 confirms that it has periodically received eNB promotion messages from the radio base station 2 through the RRC interface (step S33), it makes a transition to the transmission utilization promotion state (step S31).

Even if the terminal 3 does not receive an eNB promotion message, when it determines that a validity period described in an eNB promotion message last received from the radio base station 2 has not expired (step S34), the terminal 3 remains in the terminal utilization promotion state (step S31); when it determines that the validity period has expired (step S34), the terminal 3 makes a transition to the terminal non-utilization promotion state (step S32). Note that the terminal 3 in the terminal non-utilization promotion state cannot make a promotion call.

Figure 13:
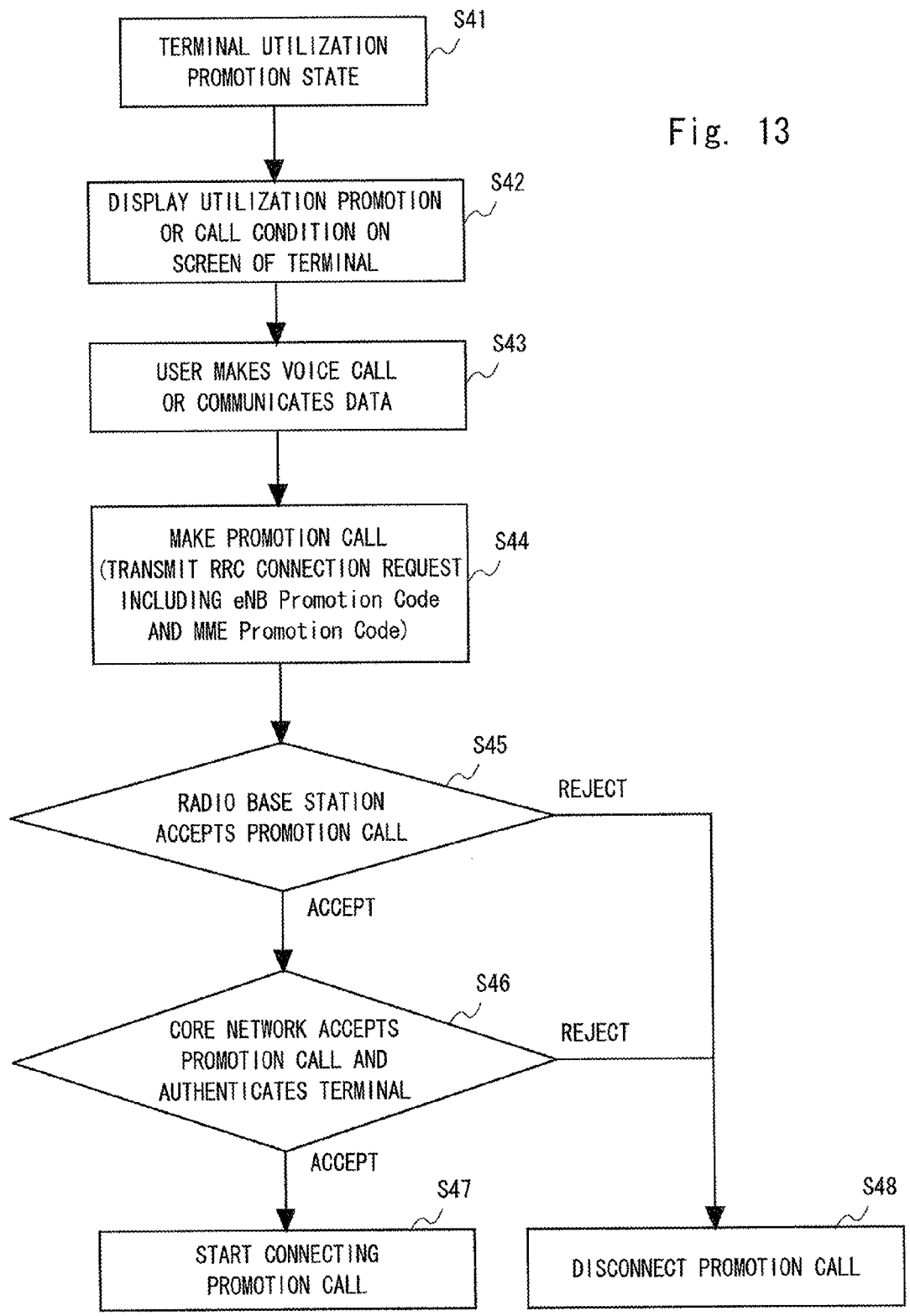
FIG. 13 is a flowchart that the user makes a promotion call using the terminal of FIG. 1 in the terminal utilization promotion state.

FIG. 13 is a flowchart that the user makes a promotion call using the terminal 3 of FIG. 1 in the terminal utilization promotion state. When the terminal 3 makes a transition to the terminal utilization promotion state (step S41), it makes a display for utilization promotion (encouraging the user to perform a communication using the terminal 3) on a display unit 303 (step S42). For example, the display is a display showing a call condition, such as a price advantageous for the user, including "20%-discount call charge in progress" and "flat rate in progress until midnight". Details of the display may be information included in the eNB promotion message transmitted from the radio base station 2.

When the user looks at the display and makes a voice call or performs data communication (step S43), the terminal 3 transmits an RRC connection request including the eNB promotion code and the MME promotion code to the radio base station 2 (step S44). Subsequently, the radio base station 2 accepts the promotion call (step S45); the core network 1 accepts the promotion call and authenticates the terminal 3 (step S46); and connection of the promotion call is started (step S47).

Figure 14:
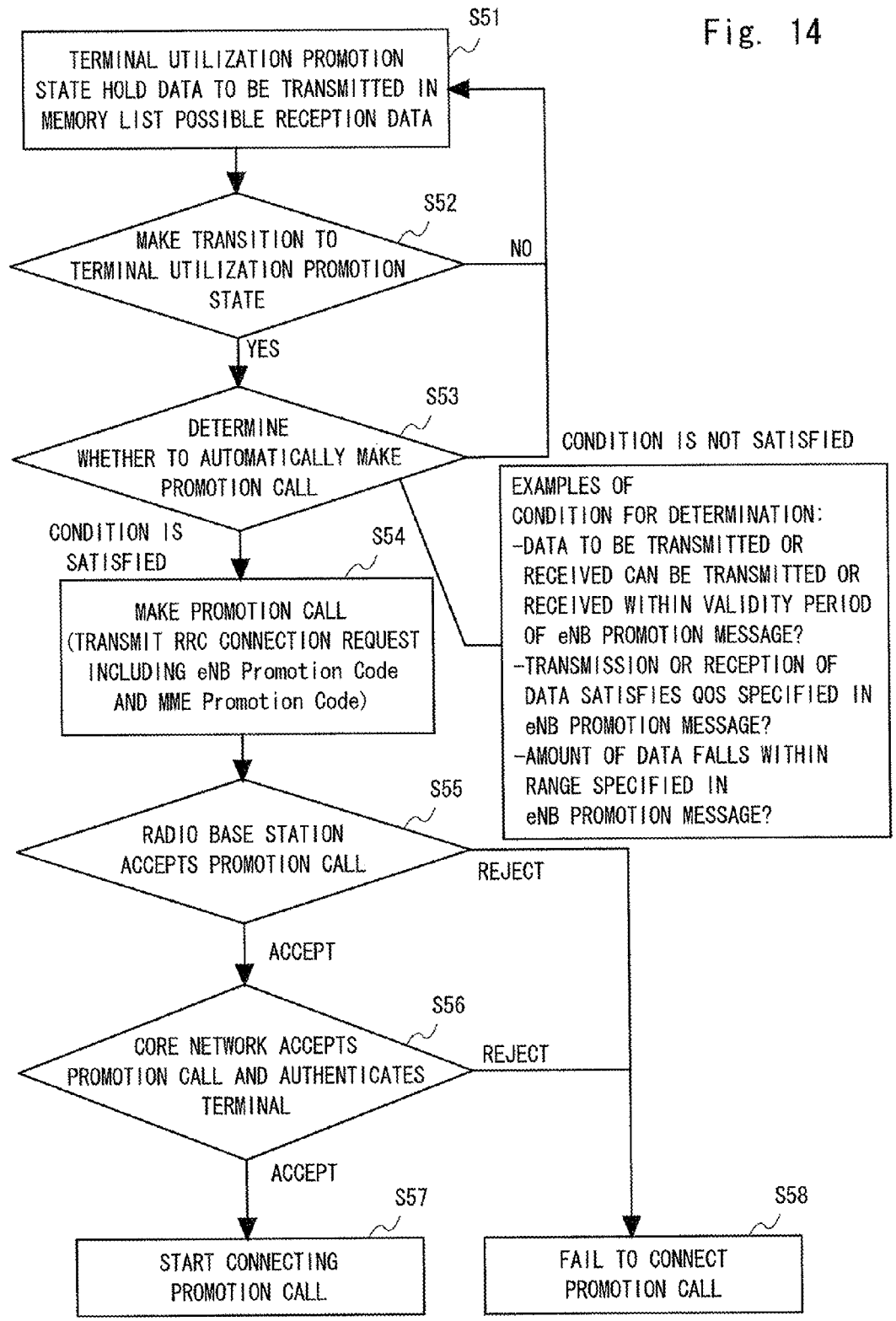
FIG. 14 is a flowchart that the terminal of FIG. 1 automatically makes a promotion call when the terminal makes a transition to the terminal utilization promotion state.

FIG. 14 is a flowchart that the terminal 3 of FIG. 1 automatically makes a promotion call when the terminal 3 makes a transition to the terminal utilization promotion state. The terminal 3 in the terminal non-utilization promotion state holds data to be transmitted in a memory (not shown) or holds a list of reception candidate data in the memory (step S51). When the terminal 3 makes a transition to the terminal utilization promotion state (step S52), it processes a determination whether to automatically make a promotion call (step S53). Examples of the condition for the determination include: based on a condition transmitted from the radio base station 2 through the eNB promotion message (the message validity period or the allowable QoS type and data amount of the call), whether the data to be transmitted or received can be transmitted or received within the message validity period, whether transmission or reception of the data to be transmitted or received satisfies specified QOS, or whether the amount of the data to be transmitted or received falls within a specified range.

In the determination whether to automatically make a promotion call, if the terminal 3 determines that there is data satisfying the above condition, it transmits an RRC connection request including the eNB promotion code and the MME promotion code to the radio base station 2 in order to transmit the data to a predetermined destination or in order to receive the data from a predetermined source (step S54). Subsequently, the radio base station 2 accepts the promotion call (step S55); the core network 1 accepts the promotion call and authenticates the terminal 3 (step S56); and connection of the promotion call is started (step S57). At the same time that the connection is started, the data satisfying the condition is transmitted or received.

In FIG. 14, when the terminal 3 makes a transition to the terminal utilization promotion state, data which does not need to be transmitted immediately (in real time) may be transmitted as the data to be transmitted. Conceivable examples of such data include: daily sales information compiled by a vending machine including the terminal 3; electricity/gas utilization information compiled by meters including the terminal 3; geographic information gathered by a vehicle including the terminal 3; weather and environmental information compiled by a sensor including the terminal 3; information about the radio environment, the position, and the terminal utilization state (traffic volume, service type, communication quality, time, or the like) of the user gathered by the terminal 3; and emails, game scores/results, photographs, moving pictures, music, documents, software, personal information, bulletin board messages, databases, or the like reserved by the user of the terminal 3 for transmission.

Alternatively, in FIG. 14, by previously listing, as possible reception data, data which does not need to be received immediately (data which does not need to be known in real time), such data may be received when the terminal 3 makes a transition to the terminal utilization promotion state. After the terminal 3 receives such data, the user can use it off-line.

Conceivable examples of such data include: update software, middleware, database, or the like which is applied to the terminal 3 itself or a computer, vending machine, machinery, or the like including the terminal 3; and emails, game software, photographs, moving pictures, music, documents, libraries, software, news, bulletin board messages, TV schedules, weather information, map information, product price information, databases, RSS feed information, or the like (which may be used in news sites, blogs, or podcast distribution) reserved by the user of the terminal 3 for reception.

Figure 15:
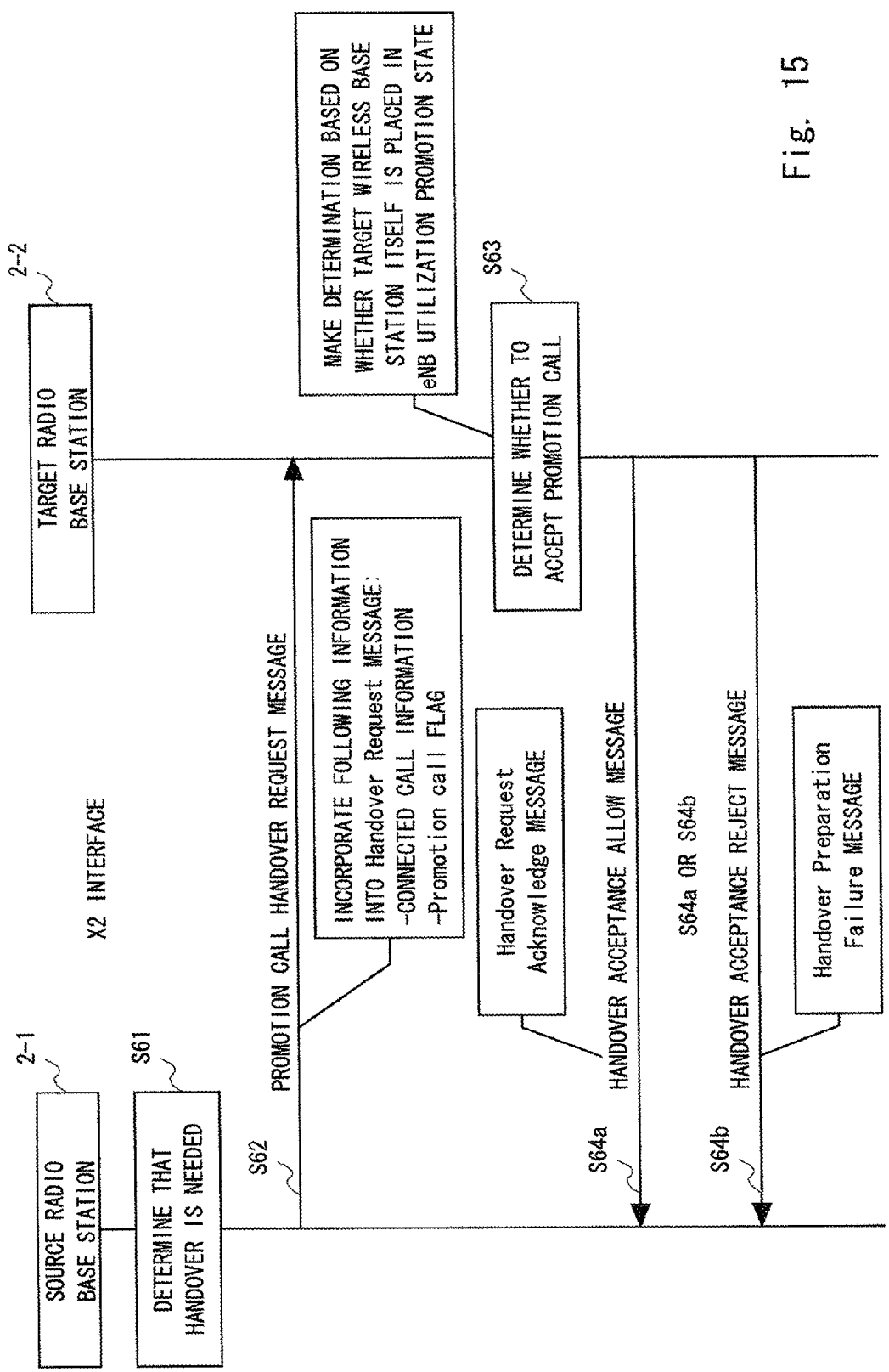
FIG. 15 is a sequence diagram showing an example of a promotion call handover operation according to the embodiment of the present invention.

Next, referring to FIGS. 15 and 16, the operations of the radio base stations 2 where a terminal 3 which is performing a communication through a promotion call is handed over between the cells of the radio base stations 2 will be described. FIG. 15 is a sequence diagram showing promotion call handover operations performed by a source radio base station 2-1 serving as a handover source and a target radio base station 2-2 serving as a handover destination which are connected together through an X2 interface.

When the source radio base station 2-1 determines that it needs to hand over the terminal 3, on the basis of the position of the terminal 3 or a change in the radio environment (step S61), it transmits a promotion call handover request message to the target radio base station 2-2 through the X2 interface (step S62). As concrete example for realizing, it is preferred to incorporate, into the terminal connected call information in the handover request message, flag information indicating that this call is a promotion call, for example, in the form of "Promotion call".

If the target radio base station 2-2, which has received the promotion call handover request message, the radio base station 2-2 is placed in the eNB utilization promotion state, it determines that it can accept this promotion call (step S63). Then, when the target radio base station 2-2 determines that it can accept this promotion call, it transmits a handover acceptance allow message (step S64*a*). In contrast, if the target radio base station 2-2 is in the eNB non-utilization promotion state and therefore determines that it cannot accept the promotion call, it transmits a handover acceptance reject message (step S64*b*).

In steps S64*a* and S64*b*, the target radio base station 2-2 preferably transmits, to the source radio base station 2-1, a handover request acknowledge message (step S64*a*) and a handover preparation failure message (step S64*b*) through the X2 interface, which are existing messages.

Figure 16:
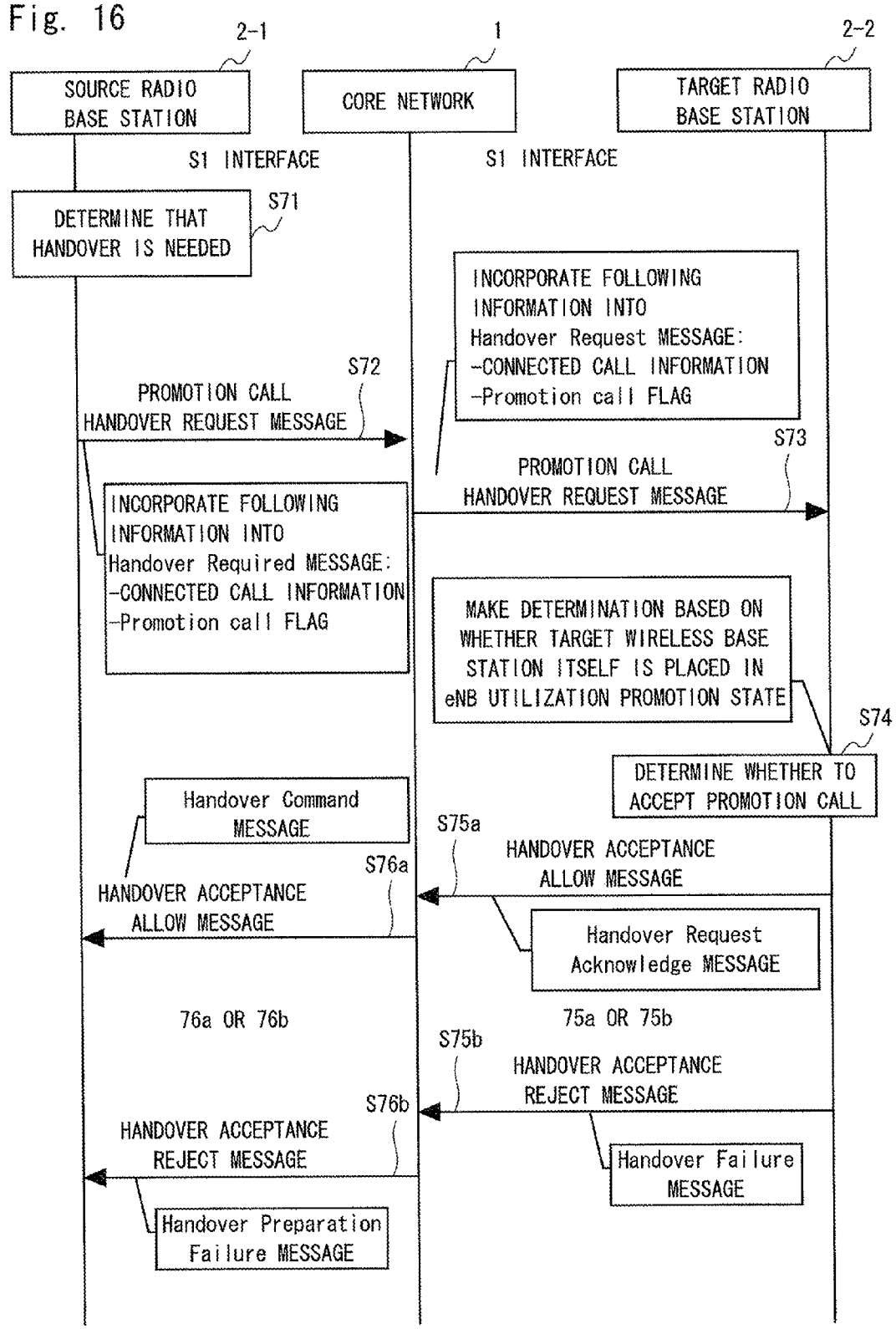
FIG. 16 is a sequence diagram showing another example of a promotion call handover operation according to the embodiment of the present invention.

FIG. 16 is a sequence diagram showing promotion call handover operations performed by the source radio base station 2-1 serving as a handover source and the target radio base station 2-2 serving as a handover destination which are not connected together through an X2 interface.

In this case, a handover message is transmitted or received through the S1 interface, which is connected with the core network 1. When the source radio base station 2-1 determines that it needs to handover the terminal 3, on the basis of the position of the terminal 3 or a change in the radio environment (step S71), it transmits a promotion call handover request message to the core network 1 through the S1 interface (step S72). As concrete example for realizing, it is preferred to incorporate, into the terminal connected call information in the handover required message, flag information indicating that this call is a promotion call, for example, in the form of "Promotion call".

The core network 1 receives the promotion call handover request message and transfers it to the target radio base station 2-2 through the S1 interface (step S73). As concrete example for realizing, it is preferred to incorporate, into the terminal connected call information in the handover request message, flag information indicating that this call is a promotion call, for example, in the form of "Promotion call".

The target radio base station 2-2 receives the promotion call handover request message. If the target radio base station 2-2 is in the eNB utilization promotion state, it determines that it can accept this promotion call (step S74). Then, when the target radio base station 2-2 determines that it can accept this promotion call, it transmits a handover acceptance allow message to the core network 1 (step S75*a*). Upon receipt of the handover acceptance allow message, the core network 1 also transfers a handover acceptance allow message (step S76*a*). In contrast, if the target radio base station 2-2 is in the eNB non-utilization promotion state and therefore determines that it cannot accept the promotion call, it transmits a handover acceptance reject message (step S75*b*). Upon receipt of the handover acceptance reject message, the core network 1 also transfers a handover acceptance reject message (step S76*b*).

In steps S75*a* and S75*b*, the target radio base station 2-2 preferably transmits, to the core network 1, a handover request acknowledge message (step S75*a*) and a handover failure message (step S75*b*) through the S1 interface, which are existing messages. Similarly, in steps S76*a* and S76*b*, the core network 1 preferably transmits, to the source radio base station 2-1, a handover command message (step S76*a*) and a handover preparation failure message (step S76*b*) through the S1 interface, which are existing messages.

As described above, in the mobile communication system according to the embodiment of the present invention, when the resource utilization rate of the core network 1 is low, the core network 1 transmits utilization promotion information for encouraging the terminals 3 to perform a communication, to the radio base stations 2 thereunder through the S1 interfaces. Thus, the utilization rate can be increased.

Further, when the resource utilization rates of either radio base station 2 and the core network 1 thereover are low, the radio base station 2 transmits utilization promotion information to the terminals 3 thereunder through the RRC interfaces. Thus, the utilization rate can be increased.

Since each terminal 3 shows promotion information to the user on the screen on the basis of the utilization promotion information from the radio base station 2, it is possible to encourage the user to use a network communication.

Alternatively, each terminal 3 automatically starts transmitting or receiving data which is previously held in the memory or reception candidate data listed in the memory on the basis of the utilization promotion information from the radio base station 2. Thus, it is possible to promote utilization of network communications.

The core network 1 applies a special price, such as a discount or flat rate, to a communication (promotion call) started based on the utilization promotion information. This can provide a new profit source to the operator of the mobile communication system, as well as providing a price which is attractive to the users.

During a handover, the radio base stations 2 transmit or receive a handover request message including flag information indicating that the call is a promotion call, through the X2 interface therebetween or through the S1 interfaces and the core network 1. Thus, it is possible to hand over the communication (promotion call) started based on the utilization promotion information.

Figure 17:
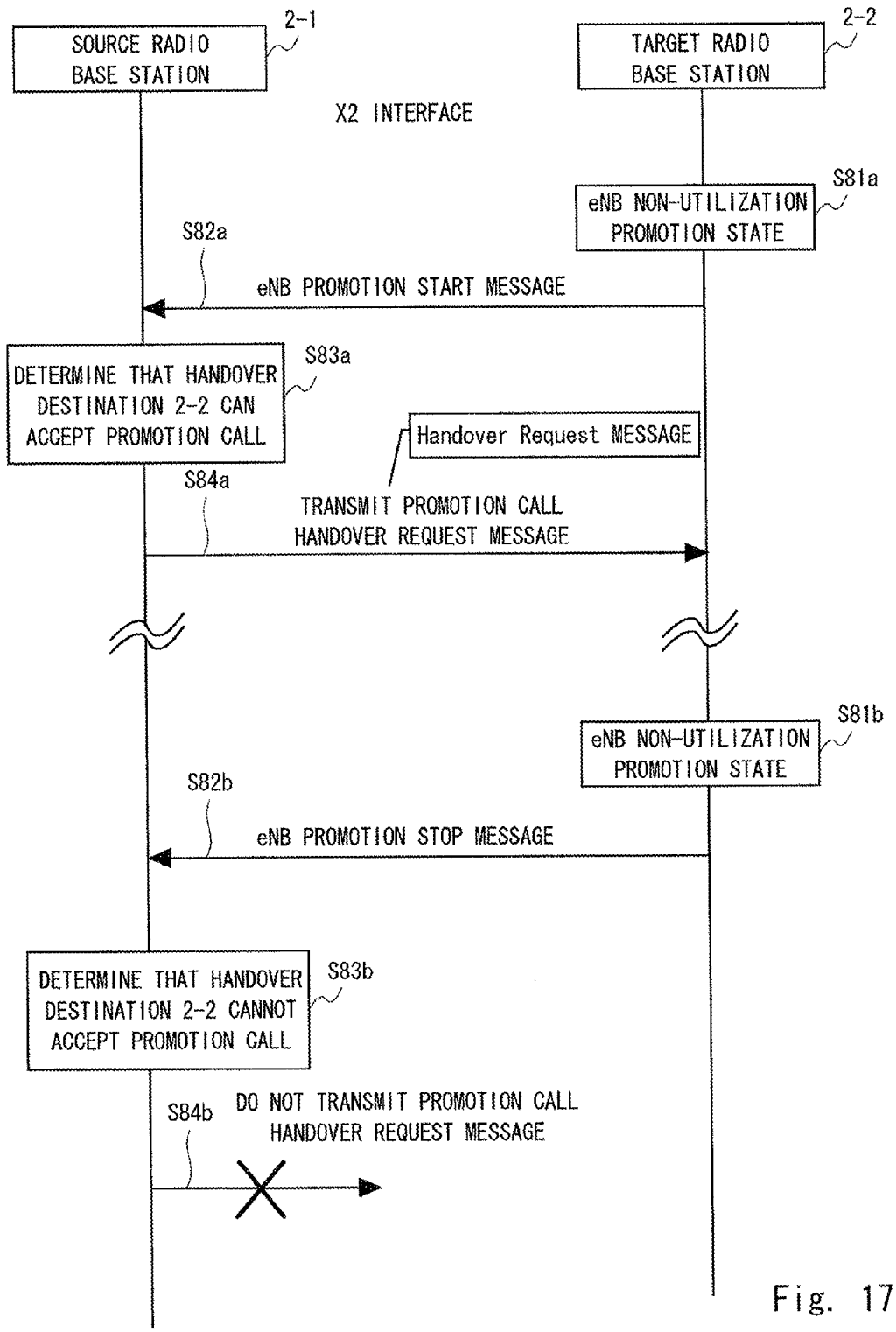
FIG. 17 is a sequence diagram showing an example of a promotion call handover operation according to the other embodiment of the present invention.

Next, the other embodiment of the present invention will be described with reference to the drawings. While the basic configuration of the mobile communication system according to the other embodiment of the present invention is the same as that described above, the other embodiment further contrives to make on a promotion call handover operation. FIG. 17 is a sequence diagram showing promotion call handover operations performed by a source radio base station 2-1 serving as a handover source and a target radio base station 2-2 serving as a handover destination which are connected together through an X2 interface according to the other embodiment of the present invention.

When the target radio base station 2-2 makes a transition to the eNB utilization promotion state (step S81*a*), it transmits an eNB promotion start message to the adjacent source radio base station 2-1 through the X2 interface (step S82*a*). The source radio base station 2-1 receives the eNB promotion start message from the target radio base station 2-2. Subsequently, when the source radio base station 2-1 needs to hand over a promotion call, it determines that the target radio base station 2-2 can accept the promotion call (step S83*a*) and transmits a promotion call handover request message (step S84*a*). Subsequent handover operations only have to be performed according to the existing specification.

In contrast, when the target radio base station 2-2 makes a transition to the eNB non-utilization promotion state (step S81*b*), it transmits an eNB promotion stop message to the adjacent source radio base station 2-1 through the X2 interface (step S82*b*). The source radio base station 2-1 receives the eNB promotion stop message from the target radio base station 2-2. Accordingly, when the source radio base station 2-1 needs to hand over a promotion call, it determines that the target radio base station 2-2 cannot accept the promotion call (step S83*b*) and does not transmit a promotion call handover request message (step S84*b*).

Figure 18:
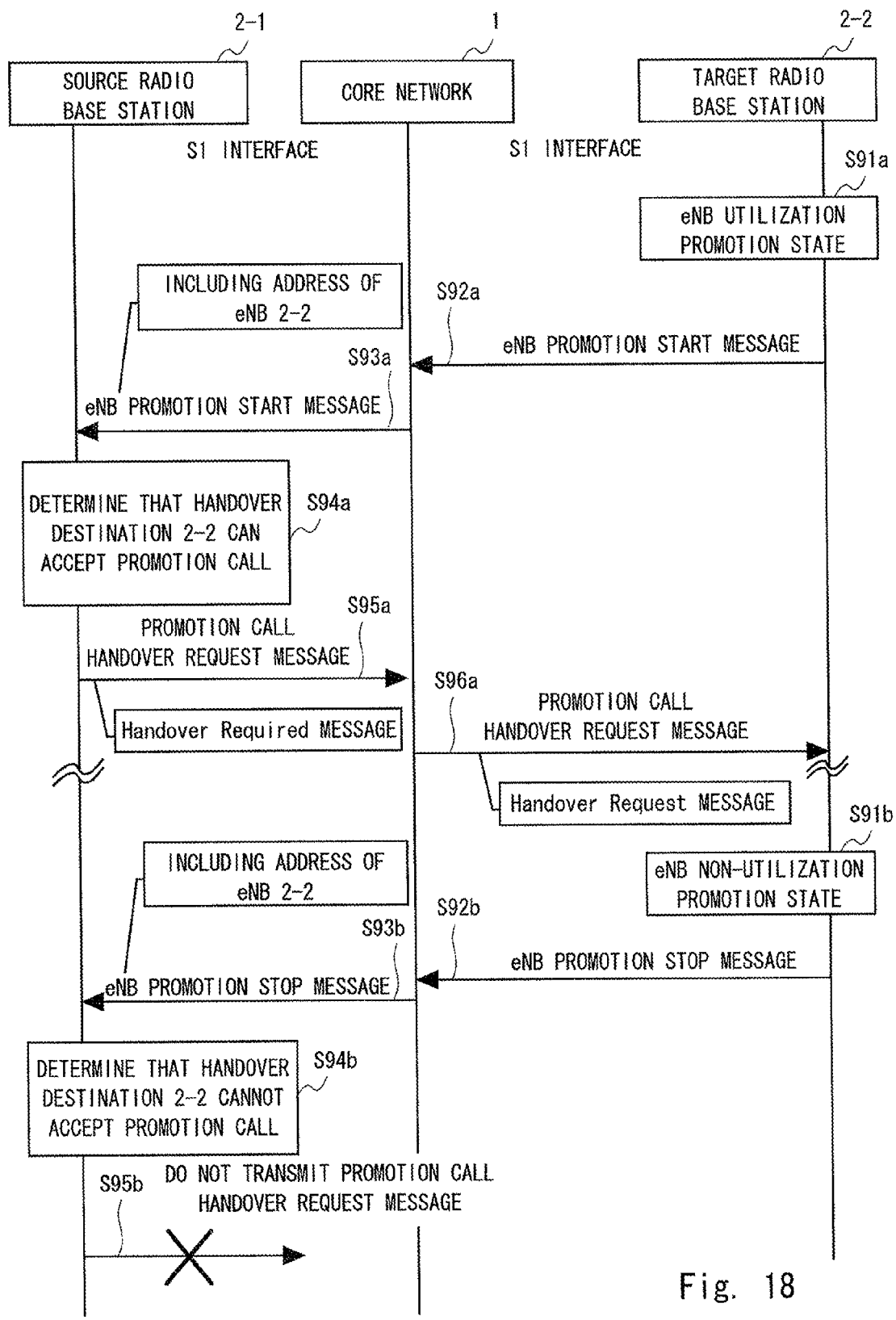
FIG. 18 is a sequence diagram showing an another example of a promotion call handover operation according to the other embodiment of the present invention.
Figure 19:
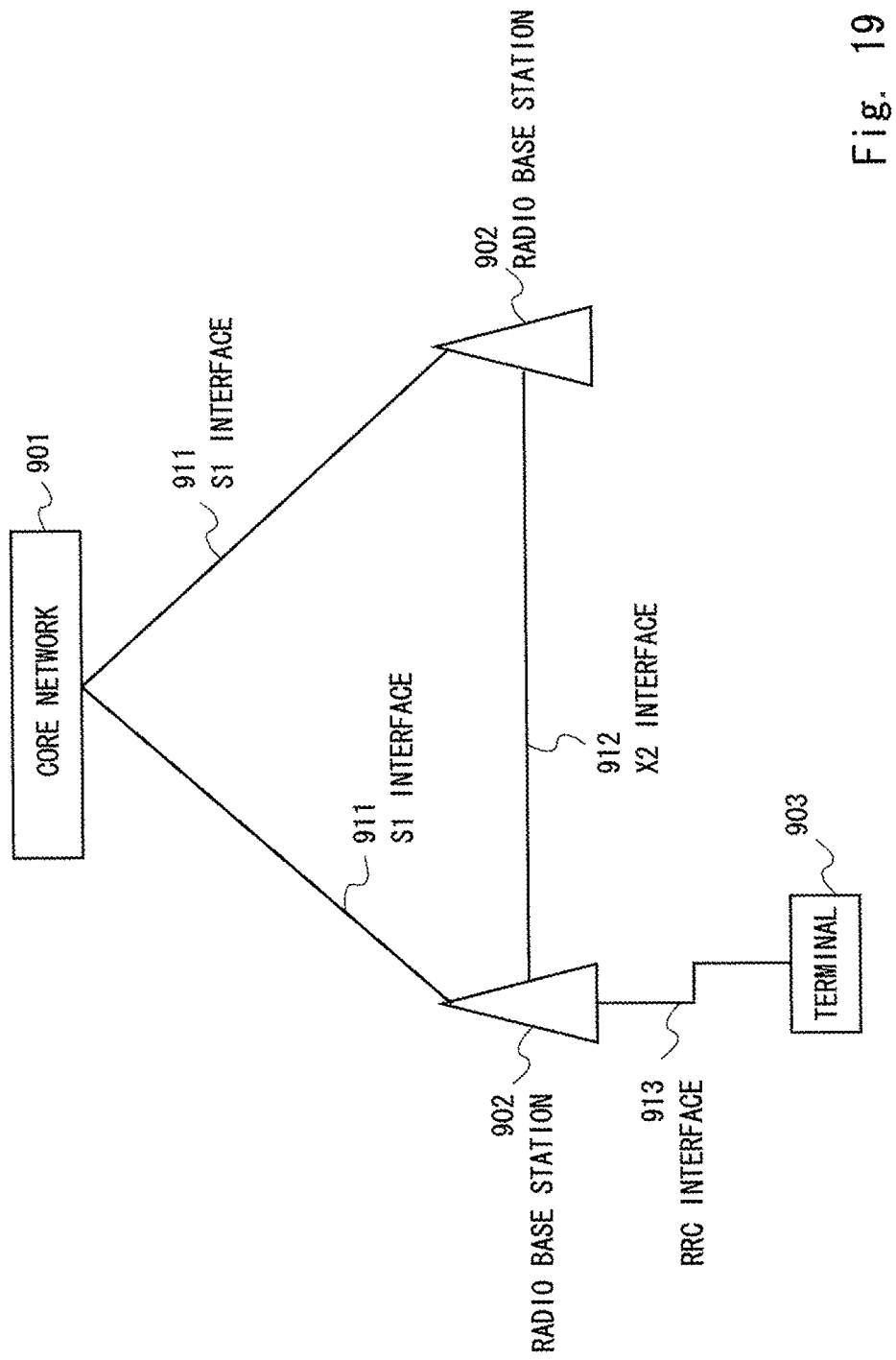
FIG. 19 is a diagram showing the configuration of a related mobile communication system.

FIG. 18 is a sequence diagram showing promotion call handover operations performed by the source radio base station 2-1 serving as a handover source and the target radio base station 2-2 serving as a handover destination which are not connected together through the X2 interface according to the other embodiment of the present invention. When the target radio base station 2-2 makes a transition to the eNB utilization promotion state (step S91*a*), it transmits an eNB promotion start message to the core network 1 through the S1 interface in order to notify the adjacent source radio base station 2-1 (step S92*a*) about what. The core network 1 receives the eNB promotion start message, incorporates the address of the target radio base station 2-2 into the message, and transfers the resulting message to the source radio base station 2-1 (step S93*a*).

The source radio base station 2-1 receives the eNB promotion start message from the target radio base station 2-2. Subsequently, when the source radio base station 2-1 needs to hand over a promotion call, it determines that the target radio base station 2-2 can accept the promotion call (step S94*a*) and transmits a promotion call handover request message (step S95*a*). Upon receipt of the promotion call handover request message, the core network 1 also transmits a promotion call handover request message (step S96*a*). In this case, for example, the source radio base station 2-1 only has to transmit a handover required message (step S95*a*), and the core network 1 only has to transmit a handover request message (step S96*a*). Subsequent handover operations only have to be performed according to the existing specification.

In contrast, when the target radio base station 2-2 makes a transition to the eNB non-utilization promotion state (step S91*b*), it transmits an eNB promotion stop message to the core network 1 through the S1 interface in order to notify the adjacent source radio base station 2-1 (step S92*b*) about what. The core network 1 receives the eNB promotion stop message, incorporates the address of the target radio base station 2-2 into the message, and transfers the resulting message to the source radio base station 2-1 (step S93*b*). The source radio base station 2-1 receives the eNB promotion stop message from the target radio base station 2-2. Accordingly, when the source radio base station 2-1 needs to hand over a promotion call, it determines that the target radio base station 2-2 cannot accept the promotion call (step S94*b*) and does not transmit a promotion call handover request message (step S95*b*).

In the other embodiment of the present invention, each radio base station 2 notifies the adjacent radio base station 2 of whether the radio base station 2 is placed in the eNB utilization promotion state or the eNB non-utilization promotion state. Thus, the source radio base station 2-1 can determine whether the target radio base station 2-2 can accept a promotion call, before transmitting a promotion call handover request message.

Some or all of the above embodiments may be described as in the following Supplementary Notes but not limited thereto.

[Supplementary Note 1]

A core network apparatus in a mobile communication system, comprising means configured to, when a resource utilization rate of the core network apparatus falls below a predetermined threshold, make a transition to a core network utilization promotion state and to transmit, to a radio base station, a utilization promotion message for encouraging a mobile terminal to perform a communication, wherein the means incorporates core network determination information into the utilization promotion message, the core network determination information being used to determine whether to accept a connection request received from the mobile terminal through the radio base station, the mobile terminal having made a transition to a terminal utilization promotion state in response to receiving the utilization promotion message through the radio base station, further comprising:

determination means configured to, when the core network apparatus placed in the core network utilization promotion state receive a connection request from the mobile terminal placed in the terminal utilization promotion state through the radio base station, determine whether to accept the connection request on the basis of the core network determination information included in the connection request; and means configured to, when the resource utilization rate of the core network apparatus exceeds the predetermined threshold, make a transition from the core network utilization promotion state to a core network non-utilization promotion state and to transmit a utilization promotion stop message to the radio base station.

[Supplementary Note 2]

The core network apparatus according to Supplementary Note 1, wherein when the core network apparatus placed in the core network non-utilization promotion state receives a connection request from the mobile terminal placed in the terminal utilization promotion state through the radio base station, the core network apparatus rejects the connection request.

[Supplementary Note 3]

The core network apparatus according to Supplementary Note 1 or 2, wherein the core network apparatus placed in the core network non-utilization promotion state disconnects a call which is being connected due to the core network apparatus placed in the core network utilization promotion state having accepted a connection request from the mobile terminal placed in the terminal utilization promotion state.

[Supplementary Note 4]

A radio base station in a mobile communication system, comprising means configured to, if a resource utilization rate of the radio base station falls below a predetermined threshold when the radio base station receives a core network utilization promotion message, the core network utilization promotion message being transmitted from a core network which has made a transition to a core network utilization promotion state when a resource utilization rate of the core network falls below a predetermined threshold, the core network utilization promotion message being intended to encourage a mobile terminal to perform a communication, make a transition to a radio base station utilization promotion state and to transmit, to the mobile terminal, a radio base station utilization promotion message for encouraging the mobile terminal to perform a communication, wherein the means incorporates radio base station determination information and core network determination information into the radio base station utilization promotion message, the radio base station determination information being used to determine whether to accept a connection request received from the mobile terminal which has made a transition to a terminal utilization promotion state in response to receiving the radio base station utilization promotion message, the core network determination information being included in the received core network utilization promotion message and used when the core network determines whether to accept the connection request, and transmits the resulting radio base station utilization promotion message, further comprising:

determination means configured to, when the radio base station in the radio base station utilization promotion state receives a connection request from the mobile terminal placed in the terminal utilization promotion state, determine whether to accept the connection request on the basis of the radio base station determination information in the connection request; and means configured to, when the connection request is determined to be accepted, transmit the connection request to the core network.

[Supplementary Note 5]

The radio base station according to Supplementary Note 4, wherein the radio base station placed in the radio base station utilization promotion state periodically transmits the radio base station utilization promotion message, and either when the radio base station receives a core network utilization promotion stop message transmitted by the core network, the core network having made a transition from the core network utilization promotion state to a core network non-utilization promotion state when the resource utilization rate of the core network exceeds the predetermined threshold, or when the resource utilization rate of the radio base station exceeds the predetermined threshold, the radio base station makes a transition from the radio base station utilization to a radio base station non-utilization promotion state and stops transmitting the radio base station utilization promotion message.

[Supplementary Note 6]

The radio base station according to Supplementary Note 5, wherein when the radio base station placed in the radio base station non-utilization promotion state receives a connection request from the mobile terminal placed in the terminal utilization promotion state, the radio base station rejects the connection request.

[Supplementary Note 7]

The radio base station according to Supplementary Note 5 or 6, wherein the radio base station placed in the radio base station non-utilization promotion state disconnects a call which is being connected due to the radio base station placed in the radio base station utilization promotion state having accepted a connection request from the mobile terminal placed in the terminal utilization promotion state.

[Supplementary Note 8]

A mobile terminal in a mobile communication system, comprising means configured to, when the mobile terminal receives a radio base station utilization promotion message, make a transition to a terminal utilization promotion state and to display a message encouraging a user to perform a communication using the mobile terminal, the radio base station utilization promotion message being transmitted from a radio base station, the radio base station having made a transition to a radio base station utilization promotion state when a resource utilization rate of the radio base station falls below a predetermined threshold when the radio base station receives a core network utilization promotion message transmitted from a core network, the radio base station utilization promotion message being intended to encourage the mobile terminal to perform a communication, the core network having made a transition to a core network utilization promotion state when a resource utilization rate of the core network falls below a predetermined threshold, the core network utilization promotion message being intended to encourage the mobile terminal to perform a communication, wherein in making a connection request to the radio base station when the mobile terminal is placed in the terminal utilization promotion state, the mobile terminal incorporates, into the connection request, radio base station determination information and core network determination information included in the received radio base station utilization promotion message, the radio base station determination information being used when the radio base station determines whether to accept the connection request, the core network determination information being used when the core network determines whether to accept the connection request.

[Supplementary Note 9]

A mobile terminal in a mobile communication system, comprising means configured to, when the mobile terminal receives a radio base station utilization promotion message transmitted from a radio base station, the radio base station having made a transition to a radio base station utilization promotion state when a resource utilization rate of the radio base station falls below a predetermined threshold when the radio base station receives a core network utilization promotion message transmitted from a core network, the radio base station utilization promotion message being intended to encourage the mobile terminal to perform a communication, the core network having made a transition to a core network utilization promotion state when a resource utilization rate of the core network falls below a predetermined threshold, the core network utilization promotion message being intended to encourage the mobile terminal to perform a communication, make a transition to a terminal utilization promotion state and to make a connection request to the radio base station in order to transmit predetermined data held by the mobile terminal to a predetermined destination or in order to receive predetermined data from a predetermined source, wherein the radio base station utilization promotion message includes data transmission/reception condition information, and the means makes the connection request when there is the predetermined data satisfying the data transmission/reception condition.

[Supplementary Note 10]

The mobile terminal according to Supplementary Note 9, wherein in making a connection request to the radio base station when the mobile terminal is placed in the terminal utilization promotion state, the mobile terminal incorporates, into the connection request, radio base station determination information and core network determination information included in the received radio base station utilization promotion message, the radio base station determination information being used when the radio base station determines whether to accept the connection request, the core network determination information being used when the core network determines whether to accept the connection request.

[Supplementary Note 11]

The mobile terminal according to any one of Supplementary Notes 8 to 10, wherein the radio base station utilization promotion message includes information about a validity period of the message and is periodically transmitted from the radio base station placed in the radio base station utilization promotion state, either when the radio base station receives a core network utilization promotion stop message transmitted from the core network, the core network having made a transition from the core network utilization promotion state to a core network non-utilization promotion state when the resource utilization rate of the core network exceeds the predetermined threshold, or when the resource utilization rate of the radio base station exceeds the predetermined threshold, the radio base station makes a transition from the radio base station utilization promotion state to a radio base station non-utilization promotion state and stops transmitting the radio base station utilization promotion message, and if, after receiving the radio base station utilization promotion message, the mobile terminal has received no radio base station utilization promotion message again over the validity period, the mobile terminal makes a transition from the terminal utilization promotion state to a terminal non-utilization promotion state.

[Supplementary Note 12]

A mobile communication system comprising:
a core network;
a radio base station; and
a mobile terminal,
the core network comprises means configured to, when a resource utilization rate of the core network falls below a predetermined threshold, make a transition to a core network utilization promotion state and to transmit, to the radio base station, a core network utilization promotion message for encouraging the mobile terminal to perform a communication, and the radio base station comprises means configured to, if a resource utilization rate of the radio base station falls below a predetermined threshold when the radio base station receives the core network utilization promotion message, make a transition to a radio base station utilization promotion state and to transmit, to the mobile terminal, a radio base station utilization promotion message for encouraging the mobile terminal to perform a communication.

[Supplementary Note 13]

The mobile communication system according to Supplementary Note 12, wherein the mobile terminal comprises means configured to, when the mobile terminal receives the radio base station utilization promotion message, make a transition to a terminal utilization promotion state and to display a message encouraging a user to perform a communication using the mobile terminal.

[Supplementary Note 14]

The mobile communication system according to Supplementary Note 12, wherein the mobile terminal comprises means configured to, when the mobile terminal receives the radio base station utilization promotion message, make a transition to a terminal utilization promotion state and to make a connection request to the radio base station in order to transmit predetermined data held by the mobile terminal to a predetermined destination or in order to receive predetermined data from a predetermined source.

[Supplementary Note 15]

The mobile communication system according to Supplementary Note 14, wherein the radio base station utilization promotion message includes data transmission/reception condition information, and when there is the predetermined data satisfying the data transmission/rectangular condition, the mobile terminal makes the connection request.

[Supplementary Note 16]

The mobile communication system according to any one of Supplementary Notes 13 to 15, wherein the core network incorporates core network determination information into the core network utilization promotion message and transmits the resulting message, the core network determination information being used when the core network determines whether to accept a connection request received from the mobile terminal placed in the terminal utilization promotion state through the radio base station, the radio base station incorporates the core network determination information and radio base station determination information into the radio base station utilization promotion message, the core network determination information being included in the received core network utilization promotion message, the radio base station determination information being used when the radio base station determines whether to accept a connection request received from the mobile terminal placed in the terminal utilization promotion state, and transmits the resulting radio base station utilization promotion message, and in making a connection request to the radio base station when the mobile terminal is placed in the transmission utilization promotion state, the mobile terminal incorporates, into the connection request, the core network determination information and the radio base station determination information included in the received radio base station utilization promotion message.

[Supplementary Note 17]

The mobile communication system according to Supplementary Note 16, wherein the radio base station comprises:
  determination means configured to, when the radio base station placed in the radio base station utilization promotion state receives a connection request from the mobile terminal placed in the terminal utilization promotion state, determine whether to accept the connection request on the basis of the radio base station determination information included in the connection request; and
  means configured to, if the connection request is determined to be accepted, transmit the connection request to the core network, and
the core network comprises determination means configured to, when the core network placed in the core network utilization promotion state receives the connection request from the radio base station, determine whether to accept the connection request on the basis of the core network determination information included in the connection request.

[Supplementary Note 18]

The mobile communication system according to any one of Supplementary Notes 13 to 17, wherein when the resource utilization rate of the core network exceeds the predetermined threshold, the core network makes a transition from the core network utilization promotion state to a core network non-utilization promotion state and transmits a core network utilization promotion stop message to the radio base station.

[Supplementary Note 19]

The mobile communication system according to Supplementary Note 18, wherein when the core network placed in the core network non-utilization promotion state receives a connection request from the mobile terminal placed in the terminal utilization promotion state through the radio base station, the core network rejects the connection request.

[Supplementary Note 20]

The mobile communication system according to Supplementary Note 18 or 19, wherein the core network placed in the core network non-utilization promotion state disconnects a call which is being connected due to the core network placed in the core network utilization promotion state having accepted a connection request from the mobile terminal placed in the terminal utilization promotion state.

[Supplementary Note 21]

The mobile communication system according to any one of Supplementary Notes 18 to 20, wherein the radio base station placed in the radio base station utilization promotion state periodically transmits the radio base station utilization promotion message and, when the radio base station receives the core network utilization promotion stop message or when the resource utilization rate of the radio base station exceeds the predetermined threshold, makes a transition from the radio base station utilization promotion state to a radio base station non-utilization promotion state and stops transmitting the radio base station utilization promotion message.

[Supplementary Note 22]

The mobile terminal according to Supplementary Note 21, wherein when the radio base station placed in the radio base station non-utilization promotion state receives a connection request from the mobile terminal placed in the terminal utilization promotion state, the radio base station rejects the connection request.

[Supplementary Note 23]

The mobile communication system according to Supplementary Note 21 or 22, wherein the radio base station placed in the radio base station non-utilization promotion state disconnects a call which is being connected due to the radio base station placed in the radio base station utilization promotion state having accepted a connection request from the mobile terminal placed in the terminal utilization promotion state.

[Supplementary Note 24]

The mobile communication system according to any one of Supplementary Notes 21 to 23, wherein the radio base station utilization promotion message includes information about a validity period of the message, and if, after receiving the radio base station utilization promotion message, the mobile terminal has received no radio base station utilization promotion message again over the validity period, the mobile terminal makes a transition from the terminal utilization promotion state to a terminal non-utilization promotion state.

[Supplementary Note 25]

The mobile communication system according to any one of Supplementary Notes 13 to 24, wherein in handing over the mobile terminal having a call being connected due to the core network and the radio base station having accepted a connection request from the mobile terminal placed in the terminal utilization promotion state (hereafter referred to as the promotion call), the radio base station serving as a handover source transmits, to a radio base station serving as a handover destination, a handover request including flag information indicating that a call to be handed over is the promotion call, and when the radio base station serving as a handover destination receives the handover request including the flag information, the radio base station serving as a handover destination determines whether to accept the handover request, on the basis of whether the radio base station serving as a handover destination is placed in the radio base station utilization promotion state.

[Supplementary Note 26]

The mobile communication system according to any one of Supplementary Notes 13 to 24, wherein the radio base station notifies an adjacent radio base station of whether the radio base station is placed in the radio base station utilization promotion state, and in handing over the mobile terminal having a call being connected due to the core network and the radio base station having accepted a connection request from the mobile terminal placed in the terminal utilization promotion state, the radio base station serving as a handover source determines whether to transmit a handover request to a radio base station serving as a handover destination, on the basis of whether the radio base station serving as a handover destination is placed in the radio base station utilization promotion state.

While the invention of the present application has been described with reference to the embodiments, the invention is not limited thereto. Various changes understandable for those skilled in the art can be made to the configuration or details of the invention of the present application without departing from the scope of the invention.

The present application claims priority based on Japanese Patent Application No. 2011-163794, filed on Jul. 27, 2011, the disclosure of which is incorporated herein in its entirety.

REFERENCE SIGNS LIST

1 CORE NETWORK
2 RADIO BASE STATION
3 TERMINAL
11 S1 INTERFACE
12 X2 INTERFACE
13 RRC INTERFACE
101 CONTROL UNIT
102 COMMUNICATION UNIT
103 RESOURCE UTILIZATION RATE DETERMINATION UNIT
104 PROMOTION CALL ACCEPTANCE DETERMINATION UNIT
111 MME PROMOTION START MESSAGE
112 MME PROMOTION STOP MESSAGE
131 ENB PROMOTION MESSAGE
201 CONTROL UNIT
202 COMMUNICATION UNIT

203 RESOURCE UTILIZATION RATE DETERMINATION UNIT
204 PROMOTION CALL ACCEPTANCE DETERMINATION UNIT
205 RADIO COMMUNICATION UNIT
301 CONTROL UNIT
302 RADIO COMMUNICATION UNIT
303 DISPLAY UNIT
304 AUTOMATIC COMMUNICATION DETERMINATION UNIT

The invention claimed is:

1. A core network apparatus in a mobile communication system, comprising:
a unit configured to, when a resource utilization rate of the core network apparatus falls below a predetermined threshold, make a transition to a core network utilization promotion state and transmit, to a radio base station, a utilization promotion message for encouraging a mobile terminal to perform a communication; and
a unit configured to, when the resource utilization rate of the core network apparatus exceeds the predetermined threshold, make a transition from the core network utilization promotion state to a core network non-utilization promotion state and transmit a utilization promotion stop message to the radio base station, wherein
either when the radio base station receives the utilization promotion stop message transmitted from the core network apparatus, the core network apparatus having made a transition from the core network utilization promotion state to the core network non-utilization promotion state when the resource utilization rate of the core network apparatus exceeds the predetermined threshold, or when the resource utilization rate of the radio base station exceeds the predetermined threshold, the radio base station makes a transition from a radio base station utilization promotion state to a radio base station non-utilization promotion state and stops transmitting a radio base station utilization promotion message,
and the mobile terminal, if, after receiving the radio base station utilization promotion message, the radio base station utilization promotion message is not received again over a predetermined period, makes a transition from a terminal utilization promotion state to a terminal non-utilization promotion state.

2. The core network apparatus according to claim 1, wherein
the unit incorporates core network determination information into the utilization promotion message, the core network determination information being used to determine whether to accept a connection request received from the mobile terminal through the radio base station, the mobile terminal having made a transition to a terminal utilization promotion state in response to receiving the utilization promotion message through the radio base station, and transmits the resulting message, further comprising
a determination unit configured to determine, when the core network apparatus in the core network utilization promotion state receives a connection request from the mobile terminal in the terminal utilization promotion state through the radio base station, whether to accept the connection request on the basis of the core network determination information in the connection request.

3. An operation control method for a core network apparatus in a mobile communication system, comprising:
when a resource utilization rate of the core network apparatus falls below a predetermined threshold, making a transition to a core network utilization promotion state and transmitting, to a radio base station, a utilization promotion message for encouraging a mobile terminal to perform a communication,
when the resource utilization rate of the core network apparatus exceeds the predetermined threshold, making a transition from the core network utilization promotion state to a core network non-utilization promotion state and transmitting a utilization promotion stop message to the radio base station,
either when the radio base station receives the utilization promotion stop message transmitted from the core network apparatus, the core network having made a transition from the core network utilization promotion state to a core network non-utilization promotion state when the resource utilization rate of the core network apparatus exceeds the predetermined threshold, or when the resource utilization rate of the radio base station exceeds the predetermined threshold, the radio base station making a transition from a radio base station utilization promotion state to a radio base station non-utilization promotion state and stopping transmitting a radio base station utilization promotion message, and
if, after receiving the radio base station utilization promotion message, a radio base station utilization promotion message is not received again over a predetermined period, the mobile terminal making a transition from a terminal utilization promotion state to a terminal non-utilization promotion state.

4. A radio base station in a mobile communication system, comprising a unit configured to, if a resource utilization rate of the radio base station falls below a predetermined threshold when the radio base station receives a core network utilization promotion message transmitted from a core network, the core network having made a transition to a core network utilization promotion state when a resource utilization rate of the core network falls below a predetermined threshold, the core network utilization promotion message being intended to encourage a mobile terminal to perform a communication, make a transition to a radio base station utilization promotion state and transmit, to the mobile terminal, a radio base station utilization promotion message for encouraging the mobile terminal to perform a communication,
wherein the unit, either when a core network utilization promotion stop message transmitted by the core network is received, the core network having made a transition from the core network utilization promotion state to a core network non-utilization promotion state when the resource utilization rate of the core network exceeds the predetermined threshold, or when the resource utilization rate of the radio base station exceeds the predetermined threshold, makes a transition from the radio base station utilization to a radio base station non-utilization promotion state and stops transmitting the radio base station utilization promotion message,
and the mobile terminal, if, after receiving the radio base station utilization promotion message, the radio base station utilization promotion message is not received again over a predetermined period, makes a transition from a terminal utilization promotion state to a terminal non-utilization promotion state.

5. An operation control method for a radio base station in a mobile communication system, comprising:

if a resource utilization rate of the radio base station falls below a predetermined threshold when the radio base station receives a core network utilization promotion message transmitted from a core network, the core network having made a transition to a core network utilization promotion state when a resource utilization rate of the core network falls below a predetermined threshold, the core network utilization promotion message being intended to encourage a mobile terminal to perform a communication, making a transition to a radio base station utilization promotion state and transmitting, to the mobile terminal, a radio base station utilization promotion message for encouraging the mobile terminal to perform a communication, and either when a core network utilization promotion stop message transmitted by the core network is received, the core network having made a transition from the core network utilization promotion state to a core network non-utilization promotion state when the resource utilization rate of the core network exceeds the predetermined threshold, or when the resource utilization rate of the radio base station exceeds the predetermined threshold, making a transition from the radio base station utilization to a radio base station non-utilization promotion state and stopping transmitting the radio base station utilization promotion message, if, after receiving the radio base station utilization promotion message, the radio base station utilization promotion message is not received again by the mobile terminal over a predetermined period, making a transition in the mobile terminal from a terminal utilization promotion state to a terminal non-utilization promotion state.

6. A mobile terminal in a mobile communication system, comprising a unit configured to, when the mobile terminal receives a radio base station utilization promotion message transmitted from a radio base station, the radio base station having made a transition to a radio base station utilization promotion state when a resource utilization rate of the radio base station falls below a predetermined threshold when the radio base station receives a core network utilization promotion message transmitted from a core network, the core network having made a transition to a core network utilization promotion state when a resource utilization rate of the core network falls below a predetermined threshold, the core network utilization promotion message being intended to encourage the mobile terminal to perform a communication, make a transition to a terminal utilization promotion state and display a message encouraging a user to perform a communication using the mobile terminal, either when the radio base station receives a core network utilization promotion stop message transmitted from the core network, the core network having made a transition from the core network utilization promotion state to a core network non-utilization promotion state when the resource utilization rate of the core network exceeds the predetermined threshold, or when the resource utilization rate of the radio base station exceeds the predetermined threshold, the radio base station makes a transition from the radio base station utilization promotion state to a radio base station non-utilization promotion state and stops transmitting the radio base station utilization promotion message, wherein the unit, if, after receiving the radio base station utilization promotion message, the radio base station utilization promotion message is not received again over a predetermined period, makes a transition from the terminal utilization promotion state to a terminal non-utilization promotion state.

7. A mobile terminal in a mobile communication system, comprising a unit configured to, when the mobile terminal receives a radio base station utilization promotion message transmitted from a radio base station, the radio base station having made a transition to a radio base station utilization promotion state when a resource utilization rate of the radio base station falls below a predetermined threshold when the radio base station receives a core network utilization promotion message transmitted from a core network, the core network having made a transition to a core network utilization promotion state when a resource utilization rate of the core network falls below a predetermined threshold, the core network utilization promotion message being intended to encourage the mobile terminal to perform a communication, the radio base station utilization promotion message being intended to encourage the mobile terminal to perform a communication, make a transition to a terminal utilization promotion state and make a connection request to the radio base station in order to transmit predetermined data held by the mobile terminal to a predetermined destination or in order to receive predetermined data from a predetermined source, either when the radio base station receives a core network utilization promotion stop message transmitted from the core network, the core network having made a transition from the core network utilization promotion state to a core network non-utilization promotion state when the resource utilization rate of the core network exceeds the predetermined threshold, or when the resource utilization rate of the radio base station exceeds the predetermined threshold, the radio base station makes a transition from the radio base station utilization promotion state to a radio base station non-utilization promotion state and stops transmitting the radio base station utilization promotion message, wherein the unit, if, after receiving the radio base station utilization promotion message, the radio base station utilization promotion message is not received again over a predetermined period, makes a transition from the terminal utilization promotion state to a terminal non-utilization promotion state.

8. An operation control method for a mobile terminal in a mobile communication system, when the mobile terminal receives a radio base station utilization promotion message transmitted from a radio base station, the radio base station having made a transition to a radio base station utilization promotion state when a resource utilization rate of the radio base station falls below a predetermined threshold when the radio base station receives a core network utilization promotion message transmitted from a core network, the core network having made a transition to a core network utilization promotion state when a resource utilization rate of the core network falls below a predetermined threshold, the core network utilization promotion message being intended to encourage the mobile terminal to perform a communication, making a transition to a terminal utilization promotion state and displaying a message encouraging a user to perform a communication using the mobile terminal, either when the radio base station receives a core network utilization promotion stop message transmitted from the core network, the core network having made a transition from the core network utilization promotion state to a core network non-utilization promotion state when the resource utilization rate of the core network exceeds the predetermined threshold, or when the resource utilization rate of the radio base station exceeds the predetermined threshold, the radio base station makes a transition from the radio base station utilization promotion state to a radio base station non-utilization promotion state and stops transmitting the radio base station utilization promotion message, if, after receiving the radio base station utilization promotion message, the radio base station utilization promotion message is not received again over a predetermined period, making a transition from the terminal utilization promotion state to a terminal non-utilization promotion state.

9. An operation control method for a mobile terminal in a mobile communication system, when the mobile terminal receives a radio base station utilization promotion message transmitted from a radio base station, the radio base station having made a transition to a radio base station utilization promotion state when a resource utilization rate of the radio base station falls below a predetermined threshold when the radio base station receives a core network utilization promotion message transmitted from a core network, the core network having made a transition to a core network utilization promotion state when a resource utilization rate of the core network falls below a predetermined threshold, the core network utilization promotion message being intended to encourage the mobile terminal to perform a communication, the radio base station utilization promotion message being intended to encourage the mobile terminal to perform a communication, making a transition to a terminal utilization promotion state and making a connection request to the radio base station in order to transmit predetermined data held by the mobile terminal to a predetermined destination or in order to receive predetermined data from a predetermined source, either when the radio base station receives a core network utilization promotion stop message transmitted from the core network, the core network having made a transition from the core network utilization promotion state to a core network non-utilization promotion state when the resource utilization rate of the core network exceeds the predetermined threshold, or when the resource utilization rate of the radio base station exceeds the predetermined threshold, the radio base station makes a transition from the radio base station utilization promotion state to a radio base station non-utilization promotion state and stops transmitting the radio base station utilization promotion message, if, after receiving the radio base station utilization promotion message, the radio base station utilization promotion message is not received again over a predetermined period, making a transition from the terminal utilization promotion state to a terminal non-utilization promotion state.

10. A mobile communication system comprising:

a core network;

a radio base station; and a mobile terminal, wherein the core network comprises:

a unit configured to, when a resource utilization rate of the core network falls below a predetermined threshold, make a transition to a core network utilization promotion state and transmit, to the radio base station, a core network utilization promotion message for encouraging the mobile terminal to perform a communication, and a unit configured to, when the resource utilization rate of the core network exceeds the predetermined threshold, make a transition from the core network utilization promotion state to a core network non-utilization promotion state and transmit a core network utilization promotion stop message to the radio base station, wherein, either when the radio base station receives a core network utilization promotion stop message transmitted from the core network, the core network having made a transition from the core network utilization promotion state to a core network non-utilization promotion state when the resource utilization rate of the core network exceeds the predetermined threshold, or when the resource utilization rate of the radio base station exceeds the predetermined threshold, the radio base station makes a transition from the radio base station utilization promotion state to a radio base station non-utilization promotion state and stops transmitting a radio base station utilization promotion message, and the mobile terminal, if, after receiving the radio base station utilization promotion message, the radio base station utilization promotion message is not received again over a predetermined period, makes a transition from a terminal utilization promotion state to a terminal non-utilization promotion state.

* * * * *